US011745667B2

(12) United States Patent
Viklund et al.

(10) Patent No.: US 11,745,667 B2
(45) Date of Patent: Sep. 5, 2023

(54) FISHING EQUIPMENT CARRIER

(71) Applicant: Thule, Inc., Seymour, CT (US)

(72) Inventors: Mark Viklund, Seymour, CT (US);
Edmund Farmer, Seymour, CT (US);
Andrew Reed, Trumbull, CT (US);
James Sener, Glastonbury, CT (US);
Garrett Fink, Glastonbury, CT (US)

(73) Assignee: Thule, Inc., Seymour, CT (US)

( * ) Notice: Subject to any disclaimer, the term of this patent is extended or adjusted under 35 U.S.C. 154(b) by 62 days.

(21) Appl. No.: 17/223,927

(22) Filed: Apr. 6, 2021

(65) Prior Publication Data

US 2022/0314894 A1    Oct. 6, 2022

(51) Int. Cl.
*A01K 97/10*   (2006.01)
*B60R 9/08*    (2006.01)

(52) U.S. Cl.
CPC ............. *B60R 9/08* (2013.01); *A01K 97/10* (2013.01)

(58) Field of Classification Search
CPC .................................. B60R 9/08; A01K 97/10
See application file for complete search history.

(56) References Cited

U.S. PATENT DOCUMENTS

| | | |
|---|---|---|
| 3,662,933 A | 5/1972 | Michal |
| 4,071,176 A | 1/1978 | Tuzee |
| 4,170,801 A | 10/1979 | Ward |
| 4,335,840 A | 6/1982 | Williams |
| 4,523,704 A | 6/1985 | Washington |
| 4,955,519 A | 9/1990 | Forrester |
| D311,368 S | 10/1990 | Garcia |
| 5,009,376 A * | 4/1991 | Usui .................. F16L 55/035 248/74.1 |

(Continued)

FOREIGN PATENT DOCUMENTS

| | | |
|---|---|---|
| CA | 1116141 A | 1/1982 |
| DE | 8511396 U1 | 7/1985 |

(Continued)

OTHER PUBLICATIONS

International Search Report and Written Opinion dated Jun. 29, 2022, for International Application No. PCT/US22/22504, 32 pages.

*Primary Examiner* — Brian D Nash
(74) *Attorney, Agent, or Firm* — Sterne, Kessler, Goldstein & Fox P.L.L.C.

(57) ABSTRACT

Equipment carriers include a carrier box and an equipment holder that can be disposed on a vehicle and can be configured to store and transport equipment, such as fishing equipment. The carrier box can include a bottom portion and a lid portion, each defining a compartment within the carrier box. A clamp can be disposed in the carrier box and configured to secure equipment that extends through the carrier box. The clamp can comprise a securement latch to secure the equipment within the carrier box. The equipment holder can include notches configured to receive equipment that extends through the equipment holder and a lid portion configured to secure the equipment in the notches. The carrier box and equipment holder can be spaced apart from one another on a vehicle such that equipment extends between and is secured by both the equipment holder and the clamp disposed in the carrier box.

23 Claims, 23 Drawing Sheets

(56) References Cited

U.S. PATENT DOCUMENTS

| | | | | |
|---|---|---|---|---|
| 5,184,794 A * | 2/1993 | Saito | ............ | F16L 3/13 248/74.1 |
| 5,226,892 A * | 7/1993 | Boswell | ............ | A61M 5/1418 24/616 |
| 5,285,942 A | 2/1994 | Wills | | |
| 5,305,978 A * | 4/1994 | Current | ............ | F16L 3/1075 248/230.4 |
| 5,319,874 A * | 6/1994 | Vance | ............ | A01K 97/08 206/315.11 |
| 6,283,288 B1 * | 9/2001 | Rich | ............ | A01K 97/06 206/315.11 |
| 6,370,810 B1 * | 4/2002 | Widerman | ............ | F16L 3/137 248/205.3 |
| 6,450,333 B1 * | 9/2002 | McClenahan | ............ | B65D 21/086 220/8 |
| 6,460,231 B2 * | 10/2002 | Bourgerie | ............ | F16M 13/02 24/518 |
| 6,561,471 B1 * | 5/2003 | Hawie | ............ | F16M 11/041 248/74.1 |
| 7,051,471 B1 * | 5/2006 | Ausborne, Jr. | ............ | A01K 97/06 206/315.11 |
| 7,165,703 B1 | 1/2007 | Howe | | |
| 7,228,655 B2 * | 6/2007 | Slatter | ............ | A01K 97/10 43/21.2 |
| 7,877,922 B1 | 2/2011 | Petrie et al. | | |
| 9,521,835 B1 | 12/2016 | Gersch | | |
| 10,294,974 B2 * | 5/2019 | Gimenes | ............ | F16L 3/1058 |
| 2002/0002791 A1 | 1/2002 | Thompson | | |
| 2005/0000144 A1 | 1/2005 | Slatter | | |
| 2006/0070292 A1 | 4/2006 | Fitzgerald | | |
| 2007/0119886 A1 | 5/2007 | Jablonski et al. | | |
| 2008/0017679 A1 | 1/2008 | Leblanc et al. | | |
| 2010/0237219 A1 * | 9/2010 | Edwards | ............ | A01K 97/10 248/537 |
| 2011/0204109 A1 * | 8/2011 | Knutson | ............ | B60R 9/08 43/21.2 |
| 2013/0255132 A1 | 10/2013 | Sela | | |
| 2017/0036614 A1 | 2/2017 | Rahman | | |
| 2018/0265013 A1 * | 9/2018 | Beznes | ............ | A01K 97/10 |
| 2019/0230911 A1 * | 8/2019 | Smigaj | ............ | A45F 3/14 |
| 2020/0029544 A1 | 1/2020 | Draper | | |
| 2020/0282917 A1 * | 9/2020 | Sagen | ............ | A01K 97/08 |

FOREIGN PATENT DOCUMENTS

| | | |
|---|---|---|
| EP | 0 483 030 A1 | 4/1992 |
| KR | 20160109145 A | 9/2016 |
| WO | 2006/004853 A1 | 1/2006 |

* cited by examiner

FISHING EQUIPMENT CARRIER

FIELD

The present disclosure relates to fishing equipment carriers. In particular, embodiments relate to vehicle-mounted fishing equipment carriers for storing and transporting fishing equipment.

BACKGROUND

Vehicle-mounted equipment carriers can be used to store and transport items during travel. Some vehicle-mounted equipment carriers can be used to store and transport sporting equipment, such as fishing rods and reels. Various mechanisms can be used to secure the fishing rods and reels to the equipment carriers, for example straps and securement arms. However, these devices can be cumbersome and difficult to use or fail to securely fasten the fishing rods or reels to the equipment carrier.

BRIEF SUMMARY

In some embodiments, a fishing equipment securement device can be used to secure fishing equipment to a vehicle and can include a clamp. The clamp can include a base, a first clamping portion having a rotation member, and a biasing member. The first clamping portion can be rotatably coupled to the base about a hinge and can be rotatable between an open position and a closed position. The biasing member can be configured to bias the first clamping portion in the closed position. In some embodiments, the biasing member includes at least one spring. In some embodiments, the clamp can also include a second clamping portion, which can be fixedly coupled to the base. In some embodiments, the biasing member includes a torsion spring.

In some embodiments, the first clamping portion includes a first wing portion extending in a first direction, and the second clamping portion includes a second wing portion extending in a second direction. In some embodiments, an opening is formed between the first and second wing portions. In some embodiments, when a fishing rod is pressed against the first and second wing portions, the first clamping portion rotates from the closed position to the open position.

In some embodiments, a portion of an inner surface of the first clamping portion is concave, and a portion of an inner surface of the second clamping portion is concave. In some embodiments, a portion of the inner surface of the first clamping portion includes padding, and a portion of the inner surface of the second clamping portion includes padding. In some embodiments, the inner surface of the first clamping portion includes a first angled removal member, and the inner surface of the second clamping portion includes a second angled removal member. In some embodiments, when a fishing rod is pressed against the first and second angled removal members, the first clamping portion rotates from the closed position to the open position. In some embodiments, when a fishing rod is disposed in the clamp, a reel coupled to the fishing rod is disposed above the fishing rod.

In some embodiments, the second clamping portion is integrally formed with the base. In some embodiments, the clamp can include a securement latch that releasably couples the first clamping portion to the second clamping portion. In some embodiments, the securement latch is rotatably coupled to the second clamping portion. In some embodiments, the securement latch is configured to engage a protrusion on the first clamping portion. In some embodiments, the securement latch can include a slot and a plurality of notches that are configured to engage the protrusion on the first clamping portion. In some embodiments, the securement latch can have a gripping portion. In some embodiments, the gripping portion can have a plurality of ribs.

In some embodiments, the first clamping portion includes a first notch configured to receive a reel stem within the first notch. In some embodiments, the second clamping portion includes a second notch configured to receive a reel stem within the second notch. In some embodiments, the first and second notches include padding.

In some embodiments, a fishing equipment carrier includes a carrier box and a clamp. The carrier box can include a bottom portion defining a first compartment space and a lid portion defining a second compartment space, and the lid portion can be movably coupled to the bottom portion. In some embodiments, the clamp includes a base that is disposed in the first compartment of the carrier box, a first clamping portion that is hingedly coupled to the base and is rotatable between an open position and a closed position, and a second clamping portion that is coupled to the base. In some embodiments, the fishing equipment carrier includes a biasing member configured to bias the first clamping portion in the closed position. In some embodiments, when a fishing rod is disposed in the clamp, a reel coupled to the fishing rod is disposed above the fishing rod.

In some embodiments, the base of the clamp is coupled to an interior surface of the first compartment of the carrier box. In some embodiments, the carrier box includes a clamp positioning rail disposed in the first compartment, and the clamp can be movably coupled to the clamp positioning rail. In some embodiments, the volume of the second compartment space of the carrier box is greater than the volume of the first compartment space of the carrier box. In some embodiments, the carrier box can include a slot disposed through the bottom portion of the carrier box and the clamp can be coupled to the bottom portion by a fastener disposed through the slot. In some embodiments, the clamp is configured to be disposed at multiple positions along the length of the slot. In some embodiments, when the lid portion of the carrier box is disposed over the bottom portion, the clamp is not accessible to a user. In some embodiments, the clamp includes a securement latch that releasably couples the first clamping portion to the second clamping portion.

In some embodiments, a fishing equipment carrier includes a fishing rod holder. The fishing rod holder can include a base portion having a first notch extending through the base portion and having a first opening on a top surface of the base portion. In some embodiments, the first notch can be configured to receive a first fishing rod. In some embodiments, the fishing rod holder includes a locking portion having a first locking member disposed adjacent to the first opening. In some embodiments, the first locking member is configured to move between an open position and a closed position. In some embodiments, in the closed position, the first locking member is disposed across the first opening.

In some embodiments, when in the closed position, the first fishing rod is disposed beneath the first locking member and a fishing line of the first fishing rod is disposed above the first locking member. In some embodiments, the base portion includes padding disposed in the first notch. In some embodiments, the locking portion is lockable in the closed position. In some embodiments, the locking portion is disposed between a front surface and a rear surface of the base portion. In some embodiments, the locking portion includes a handle coupled to the first locking member, and the handle is configured to move the first locking member from the open position to the closed position.

In some embodiments, the base portion includes a second notch extending through the base portion and having a second opening on the top surface of the base portion. In some embodiments, the second notch is configured to receive a second fishing rod. In some embodiments, the locking portion includes a second locking member disposed adjacent to the second opening, and the second locking member is configured to move between an open position and a closed position. In some embodiments, in the closed position the second locking member is disposed across the second opening. In some embodiments, the first and second locking members are configured to move from the open position to the closed position simultaneously.

In some embodiments, a fishing equipment carrier includes a carrier box and a fishing rod holder. In some embodiments, the carrier box includes a bottom portion and a lid portion. In some embodiments, a maximum height of the lid portion is greater than a maximum height of the bottom portion. In some embodiments, the lid portion is disposed above the bottom portion in a closed configuration. In some embodiments, a fishing rod holder includes a base portion having a fishing rod receptacle that is configured to receive a fishing rod. In some embodiments, a locking member can be disposed adjacent to the fishing rod receptacle and a handle can be coupled to the locking member. In some embodiments, the handle is configured to move the locking member from an open position to a closed position to secure a fishing rod in the fishing rod receptacle. In some embodiments, the fishing rod extends through the base portion of the fishing rod holder and into the carrier box. In some embodiments, a reel of the fishing rod is disposed above the fishing rod when the fishing rod is disposed in a clamp in the carrier box.

In some embodiments, a fishing rod holder can include a base portion and an upper portion hingedly coupled to the base position. In some embodiments, the upper portion can be configured to pivot between an open position and a closed position. In some embodiments, the fishing rod holder can include a latch disposed on the base configured to engage an end of the upper portion when the upper portion is in the closed position. In some embodiments, the fishing rod holder can include a releasable fastener disposed on the base portion and configured to disengage the upper portion form the base portion and allow the upper portion to move to the open position. In some embodiments, the fishing rods extend through the base portion of the fishing rod holder and into the carrier box.

In some embodiments, the base of the fishing equipment carrier can include a plurality of fishing rod receptacles that are configured to receive a fishing rod. In some embodiments, the plurality of fishing rod receptacles each form an acute angle and are configured to receive fishing rods of varying diameters. In some embodiments, the fishing equipment carrier can include a plurality of clamps disposed in the carrier box. In some embodiments, the clamps can each be configured to hold the fishing rod. In some embodiments, a first clamp can be offset relative to a second clamp along a length of the carrier box.

In some embodiments, the fishing equipment carrier box can include a bottom portion and a plurality of clamps coupled to the bottom portion. In some embodiments, the bottom portion defines a compartment space having a longitudinal direction defined by a front end and a rear end of the carrier box and a transverse direction defined by a first lateral side and a second lateral side of the carrier box. In some embodiments, the plurality of clamps are each configured to secure a fishing rod. In some embodiments, a first clamp is disposed in a first position and a second clamp is disposed in a second position. In some embodiments, the first position is offset from the second position in both the longitudinal and transverse directions. In some embodiments, the plurality of clamps are adjustably coupled to the bottom portion of carrier box and configured to be disposed at multiple positions along the longitudinal direction of the carrier box.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

Figure 1:
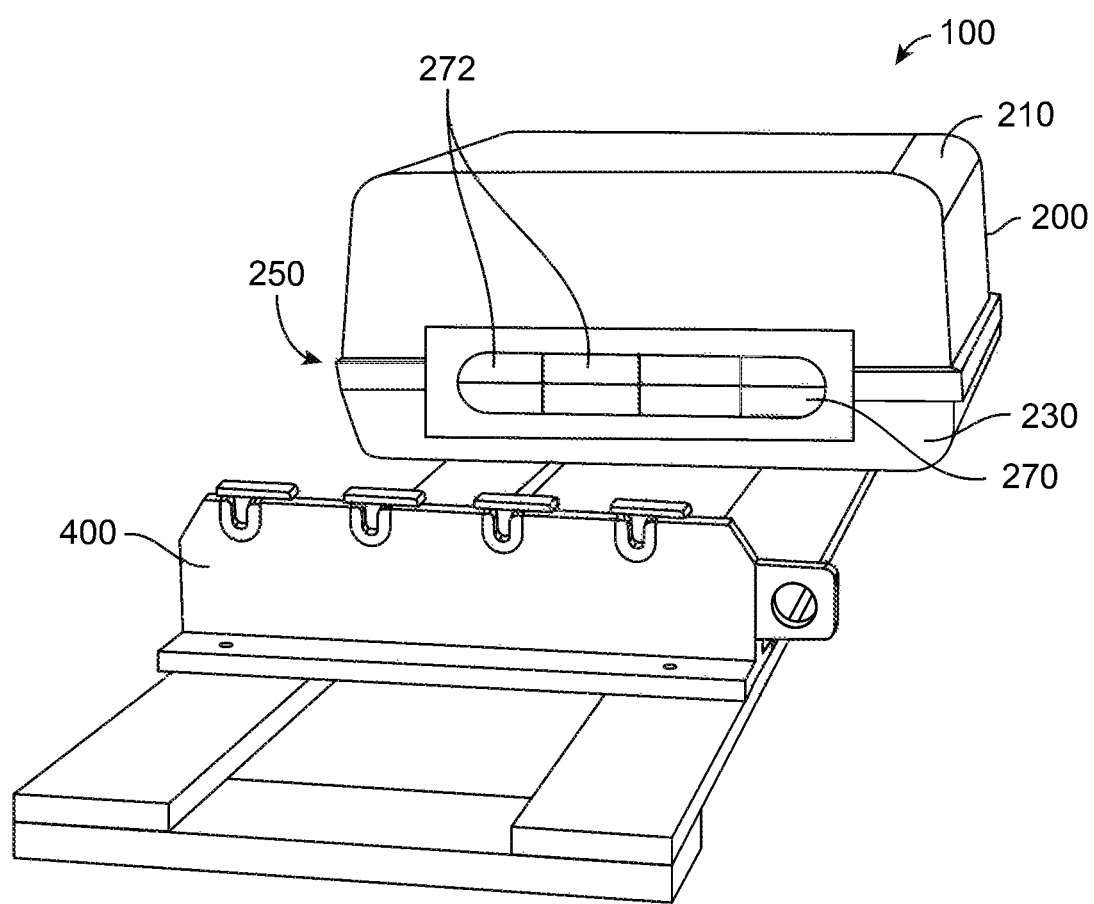
FIG. 1 is a perspective view of an equipment carrier according to an embodiment.

The features and advantages of the embodiments will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "an exemplary embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Vehicle-mounted equipment carriers can be used to store and transport items such as, for example, sporting equipment during travel. Equipment used with vehicle-mounted equipment carriers can be, for example, too large to fit inside the vehicle, or can have other characteristics (e.g., regularly being dirty or wet) that would make storing or transporting the equipment within the vehicle difficult, inconvenient, or unpleasant for the user. Some vehicle-mounted equipment carriers are mounted on the roof of the vehicle, for example, which can offer secure transport of items without obstructing the field of vision of the driver. However, some roof-mounted equipment carriers can be difficult for a user to employ since the user may need to reach above the vehicle or use a ladder, for example, in order to load or unload the equipment in the equipment carrier.

Some equipment carriers can include an equipment holding device (e.g., an equipment slot, clamp, or strap) configured to hold or align the equipment in the equipment carrier. However, such devices may not securely hold the equipment and can allow the equipment to move or vibrate during transport, which can cause damage to the equipment. Further, some equipment holding devices used in equipment carriers can be difficult for a user to operate by, for example, requiring a user to use both hands to operate the equipment holding device. Difficulty or inconvenience associated with the operation of such equipment securement devices can be accentuated when the equipment carrier is disposed on the roof of a vehicle or other potentially difficult to reach location. Thus, by making the equipment carrier easier to access and/or operate, a user's experience with the equipment carrier can be significantly improved.

Embodiments of the present disclosure provide vehicle-mounted equipment carriers that are easily accessible by a user and that include equipment securing devices that are convenient for a user to operate. Embodiments are configured to store and transport various kinds of equipment such as, for example, fishing equipment (e.g., fishing rods and fishing reels), winter sports equipment (e.g., skis and/or ski poles), or other sporting equipment or non-sporting equipment. The equipment securing devices secure the equipment in a manner that reduces movement and vibration of the equipment, thereby reducing the potential damage to the equipment during transport.

Equipment carriers as described herein can include a carrier box and an equipment holder for securing equipment. In some embodiments, the carrier box and the equipment holder can both be disposed on the roof of a vehicle. In some embodiments, the carrier box and equipment holder are disposed adjacent to, but spaced away from one another, where the equipment extends between and is secured by the equipment holder and an equipment securement device (e.g., a clamp) disposed in the carrier box. For example, the equipment holder can be disposed closer to the front of the vehicle, the carrier box can be disposed closer to the rear of the vehicle, and the equipment can extend between the carrier box and the equipment holder in a direction substantially parallel to the direction of travel of the vehicle.

A carrier box as described herein can include a base portion defining a first compartment and a lid portion defining a second compartment, where the lid portion can be moved between an open position and a closed position above the bottom portion. An equipment securement device can be disposed in the base portion of the carrier box and can be configured to secure equipment disposed in or extending through the carrier box. The equipment securement device can include, for example, a clamp, where the clamp can be movable between an open position and a closed position by rotating a portion of the clamp in order to create or enlarge an opening configured to receive the equipment. In some embodiments, the equipment securement device can be opened and closed using only one hand or by pressing the equipment against the equipment securement device, thereby making loading and unloading easier for a user. The equipment securement device can grip the equipment with sufficient force to prevent the equipment from moving and/or vibrating significantly during transport.

Equipment holders as described herein can include a base portion with notches disposed thereon that are configured to receive and hold equipment that extends through the equipment holder. The equipment holder can also include a locking portion configured to secure the equipment disposed in the notches of the base portion. The locking portion can be easily opened and closed by a user by, for example, pulling or pushing on a handle. The equipment holder can also include padding or gripping material such as thermoplastic elastomers to reduce the movement and/or vibration of equipment during transport.

In some embodiments, the equipment carrier is configured to store fishing equipment (e.g., a fishing rod and reel). The equipment securement device can be configured to store a fishing rod and reel in a "reel-up" configuration, which is to say that the reel of the fishing rod is disposed vertically above the fishing rod when the fishing rod is secured in the equipment securement device. As discussed in further detail below, by securing the fishing equipment in a reel-up configuration, the equipment securement device can be more easily accessible by a user, thus improving the user's ability to load and unload the equipment carrier.

Embodiments will now be described in more detail with reference to the figures. With reference to FIGS. 1-5, for example, an equipment carrier 100 can include a carrier box 200 and an equipment holder 400 and can be configured to store, secure, and/or transport equipment 10. Equipment 10 can include, for example, a fishing rod 12 or other fishing equipment. In some embodiments, equipment carrier 100 is configured to store and/or transport other types of sporting equipment such as, for example, skis, ski poles, snowboards, paddles, rackets, clubs, track and field equipment, or other sporting equipment. In some embodiments, equipment carrier 100 is configured to store and/or transport non-sporting equipment.

In some embodiments, equipment carrier 100 is configured to be disposed on a vehicle 20. Vehicle 20 can be, for example, a car, truck, van, sport utility vehicle, off-road vehicle, recreational vehicle, camper, trailer, boat, or other passenger or non-passenger vehicle. In some embodiments, equipment carrier 100 is disposed on the roof of vehicle 20 (see, e.g., FIG. 2). In some embodiments, equipment carrier 100 is disposed on the side, rear, or other portion of vehicle 20. In some embodiments, equipment carrier 100 is configured to be mounted on a vehicle rack such as, for example, a car rack, truck rack, or roof rack. In some embodiments, equipment carrier 100 is indirectly attached to vehicle 20, for example, by being disposed on top of a collapsible tent that is disposed on the roof of vehicle 20 or by being disposed on an apparatus mounted to a hitch of vehicle 20.

Figure 2:
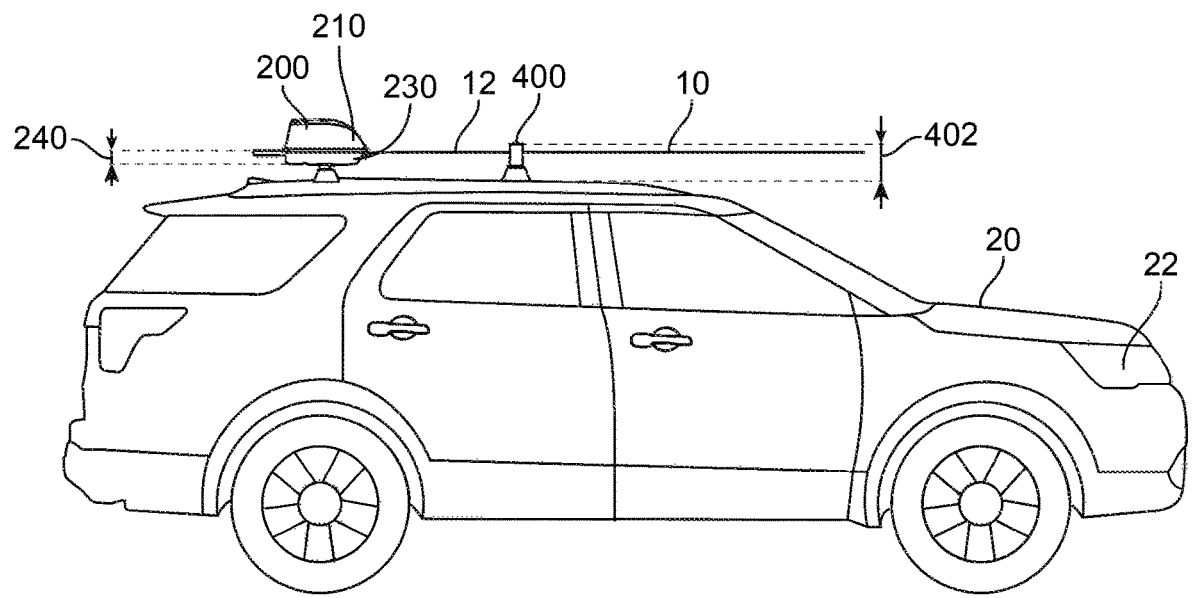
FIG. 2 is a side view of an equipment carrier on a vehicle according to an embodiment.

Carrier box 200 and equipment holder 400 can be spaced apart on vehicle 20 such that equipment 10 extends between carrier box 200 and equipment holder 400. As shown in FIG. 2, for example, in some embodiments, equipment carrier 100 is configured to store equipment 10 in a horizontal configuration, which is to say that carrier box 200 is horizontally displaced from equipment holder 400 such that equipment 10 extends in a substantially horizontal direction between carrier box 200 and equipment holder 400. In some embodiments, equipment holder 400 is disposed in front of carrier box 200, which is to say that equipment holder 400 is disposed closer to a front end 22 of vehicle 20 than carrier box 200. In some embodiments, equipment carrier 100 is configured to store equipment 10 in a vertical configuration (e.g. on the rear of an RV), which is to say that carrier box 200 is vertically displaced from equipment holder 400 such that equipment 10 extends in a substantially vertical direction between carrier box 200 and equipment holder 400.

Figure 4:
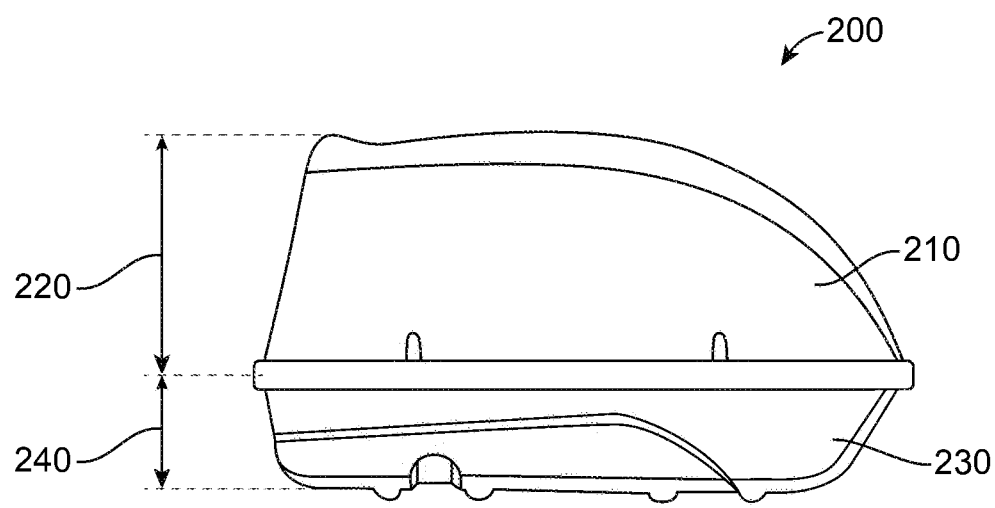
FIG. 4 is a side view of a carrier box according to an embodiment.
Figure 5:
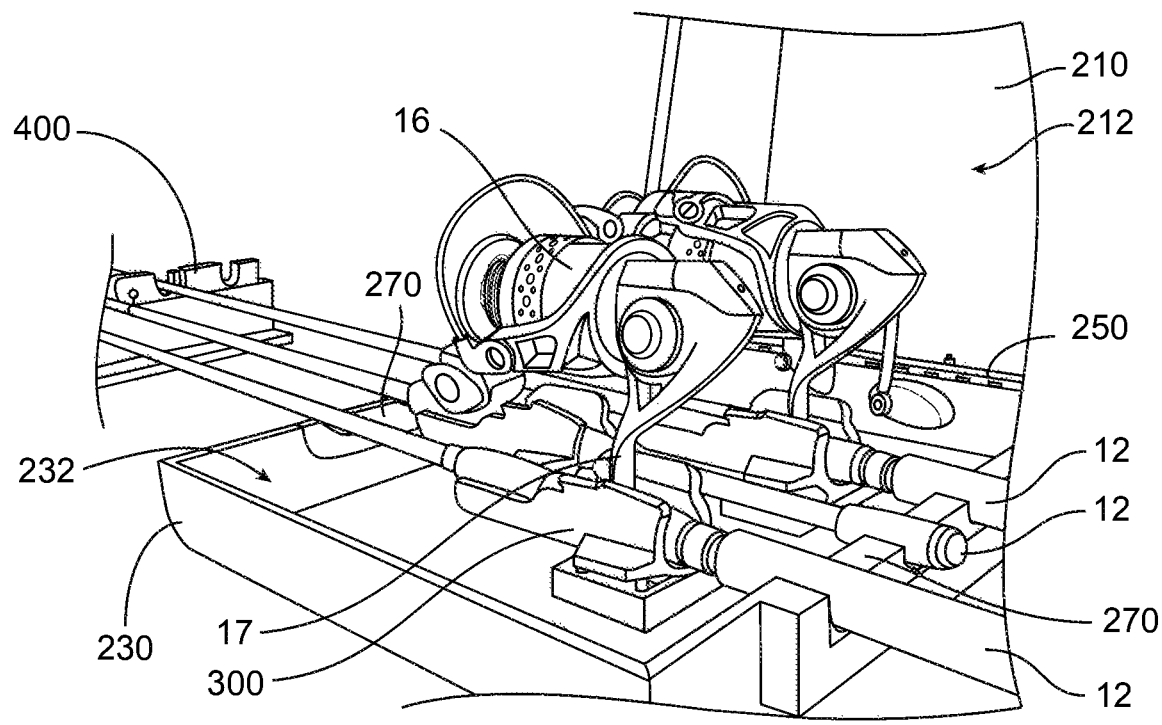
FIG. 5 is a perspective view of a portion of an equipment carrier according to an embodiment.

With reference to FIGS. 4 and 5, for example, carrier box 200 can include a lid portion 210 defining a first compartment space 212 and a bottom portion 230 defining a second compartment space 232. In some embodiments, in a closed position, lid portion 210 is disposed above bottom portion 230 such that first and second compartment spaces 212, 232 are not accessible to a user (see, e.g., FIG. 4). In some embodiments, in an open position, lid portion 210 is moved away from bottom portion 230 such that first and second compartment spaces 212, 232 are accessible to a user (see, e.g., FIG. 5). In some embodiments, lid portion 210 is rotatably coupled to bottom portion 230 about a hinge 250. In some embodiments, lid portion 210 can be completely decoupled from bottom portion 230. Lid portion 210 can be secured in the closed position to bottom portion 230 using a variety of means, such as, for example, snap-fit, locks, clamps, hinges, straps, or latches. In some embodiments, carrier box 200 can be lockable in the closed position. In some embodiments, carrier box 200 can include only a bottom portion 230 with no lid portion 210. In some embodiments, bottom portion 230 can be substantially flat.

In some embodiments, bottom portion 230 and/or lid portion 210 are made of plastic. In some embodiments, bottom portion 230 and/or lid portion 210 are manufactured using a thermoforming process. In some embodiments, bottom portion 230 and/or lid portion 210 are made of metal or other rigid material.

In some embodiments, the volume of first compartment space 212 is greater than the volume of second compartment space 232. In some embodiments, the volume of second compartment space 232 is greater than the volume of first compartment space 212. In some embodiments, the volume of first compartment space 212 and the volume of second compartment space 232 are approximately equal. In some embodiments, a maximum height 220 of lid portion 210 is greater than a maximum height 240 of bottom portion 230. In some embodiments, maximum height 240 of bottom portion 230 is greater than maximum height 220 of lid portion 210. In some embodiments, maximum height 220 of lid portion 210 is approximately equal to maximum height 240 of bottom portion 230.

Figure 30:
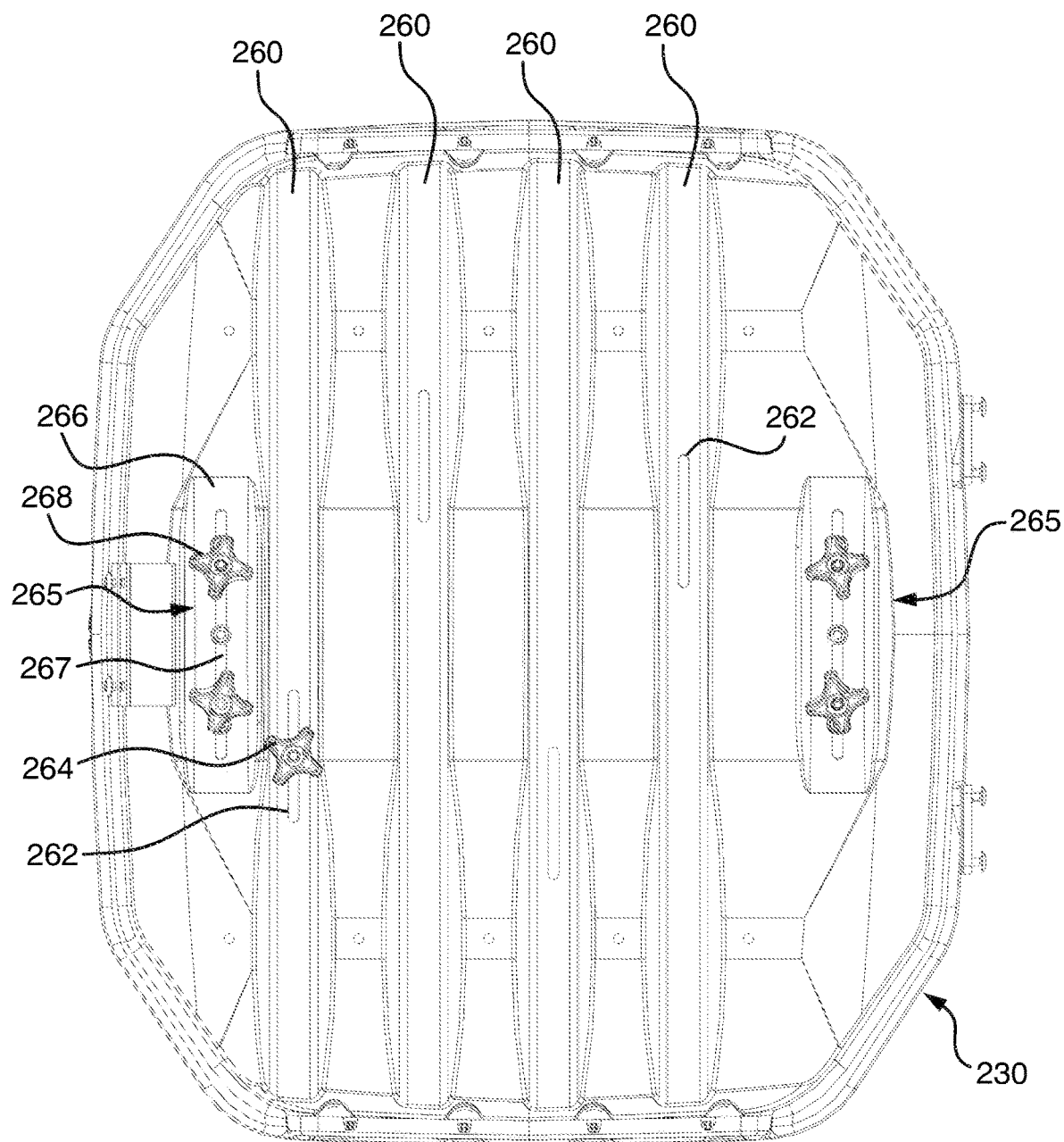
FIG. 30 is a top view of an interior of a carrier box according to an embodiment.
Figure 31:
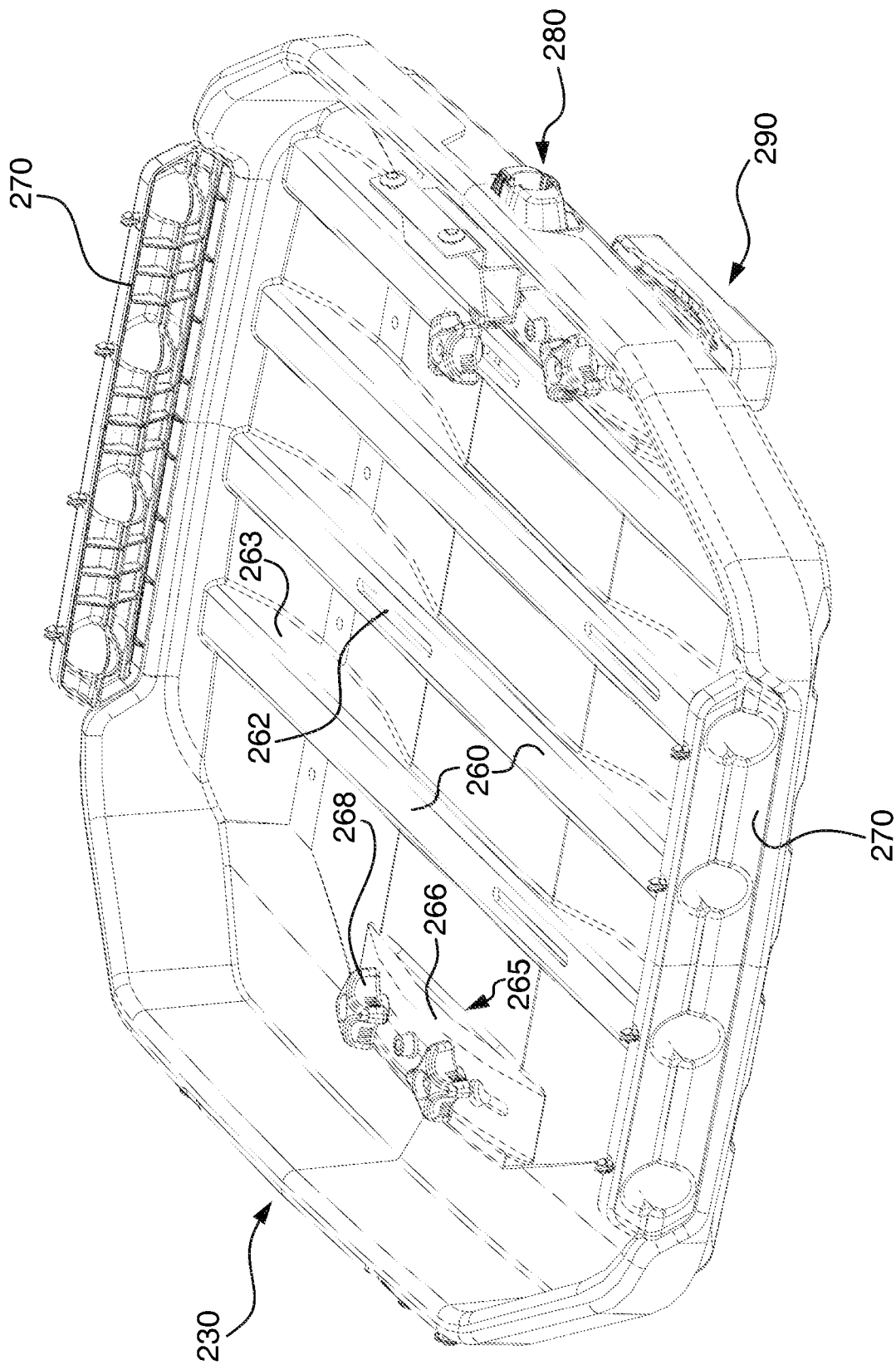
FIG. 31 is a perspective view of an interior of a carrier box according to an embodiment.

In some embodiments, as shown in FIGS. 30 and 31 for example, bottom portion 230 can include one or more mounting portions 265 for engaging a mounting bracket 290. Mounting portions 265 can include a raised portion 266 such that mounting bracket 290 can be coupled to bottom portion 230 without interfering with the low profile of the carrier box 200. As shown in FIG. 31, for example, raised portion 266 allows mounting bracket 290 to be recessed within bottom portion 230 and therefore allows carrier box 200 to be disposed closer to the roof of a vehicle. This lower position of the carrier box 200 can make it easier for a user to see and/or reach fishing rod 12 and reel 16 when held in equipment carrier 100 or when placing fishing rod 12 into equipment carrier 100. Mounting portion 265 can include a slot 267 and one or more fasteners 268 for allowing an adjustable securement of mounting bracket 290 along the length of slot 267. In some embodiments, mounting brackets 290 are rotatable (e.g., forward and/or rearward with respect to a lengthwise direction of carrier box 200) to allow for leveling of carrier box 200 onto a roof of a vehicle 20. In some embodiments, mounting brackets 290 can rotate 0-20 degrees in each direction. In some embodiments, mounting brackets 290 can rotate about 10 degrees in each direction. In some embodiments, mounting brackets 290 are secured to bottom portion with a plurality of fasteners 268. In some embodiments, two fasteners 268 allow for more precise adjustment and greater stability of mounting bracket 290 as it engages a roof rack of a vehicle 20.

In some embodiments, as shown in FIG. 31 for example, bottom portion 230 can include a locking member 280 for locking carrier box 200 when lid portion 210 is in the closed position to prevent theft or unintentional opening. Locking member 280 can include latches, deadbolts, knob locks, padlocks, or other suitable locking mechanisms.

As mentioned above and with reference to FIGS. 2-4, in some embodiments, equipment carrier 100 can be configured to hold fishing rod 12 and a fishing reel 16 in a reel-up configuration. Compared to a "reel-down" configuration, for example—where fishing reel 16 of fishing rod 12 is disposed vertically beneath fishing rod 12 when fishing rod 12 is secured in the equipment carrier 100—a reel-up configuration can make it easier for a user to see and/or reach fishing rod 12 and reel 16 when held in equipment carrier 100. FIG. 2, for example, shows an equipment carrier 100 configured to secure fishing rod 12 and reel 16 in a reel-up configuration, while FIG. 3, for example, shows an equipment carrier 100 configured to secure fishing rod 12 and reel 16 in a reel-down configuration.

Figure 3:
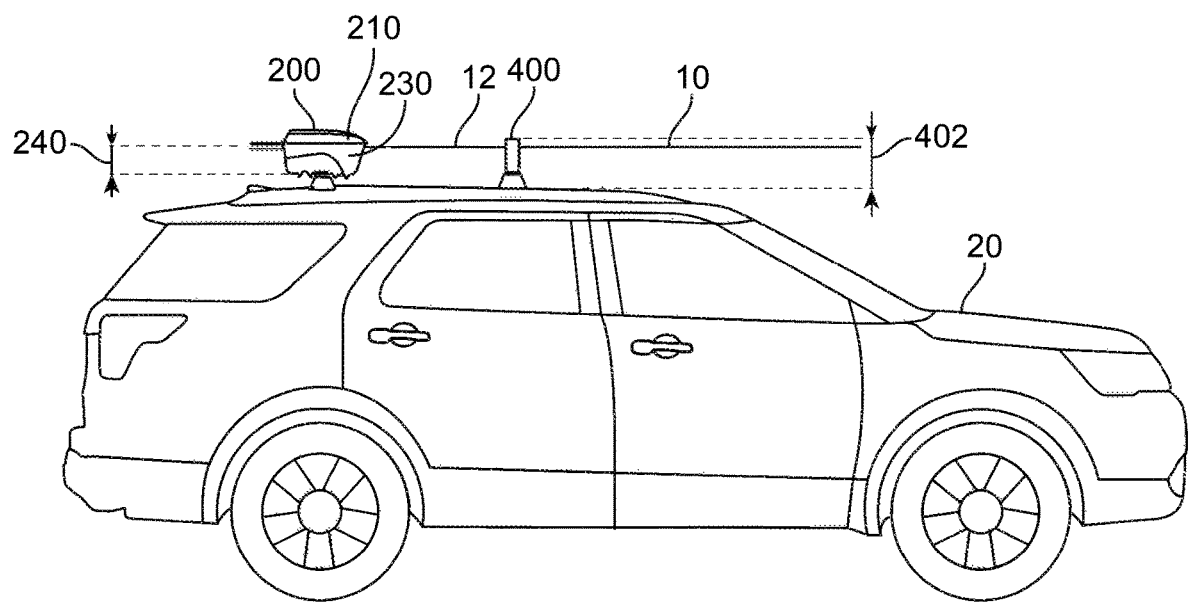
FIG. 3 is a side view of an equipment carrier on a vehicle according to an embodiment.
Figure 11:
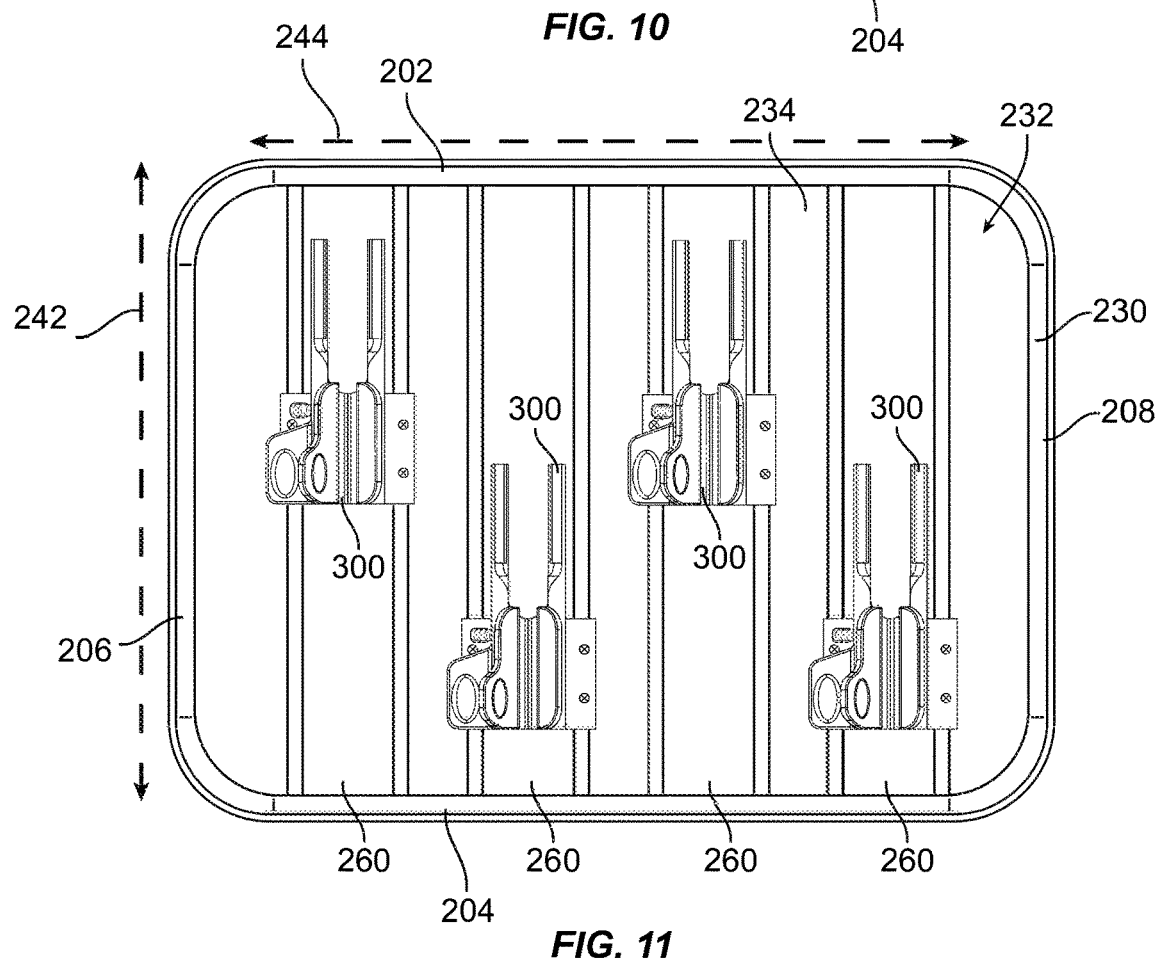
FIG. 11 is a top view of a carrier box according to an embodiment.

By positioning fishing rod 12 and reel 16 in a reel-up configuration, fishing rod 12 can be positioned closer to the bottom of carrier box 200, thereby allowing bottom portion 230 to have a smaller maximum height 240 (see FIG. 2) than if fishing rod 12 and reel 16 were stored in a reel-down configuration (see FIG. 3). In some embodiments, where equipment holder 400 is disposed on the roof of a vehicle 20, for example, a smaller maximum height 240 of bottom portion 230 can make it easier for a user to see and/or reach fishing rod 12 and reel 16 when held in equipment carrier 100. Likewise, a smaller maximum height 240 of bottom portion 230 can make it easier for a user to see and/or reach into second compartment space 232. As shown in FIG. 11, for example, carrier box 200 has a longitudinal direction 242 that is defined by a front end 202 and a rear end 204, and a transverse direction 244 that is defined by a first lateral side 206 and a second lateral side 208.

With reference to FIGS. 1 and 2, for example, in some embodiments, equipment 10 can be disposed in and extend through carrier box 200. In some embodiments, carrier box 200 can include a sealing portion 270 disposed between lid portion 210 and bottom portion 230 of carrier box 200. Sealing portion 270 can be configured to provide a seal between equipment 10 and carrier box 200 when equipment 10 is disposed in and/or extending through carrier box 200. In some embodiments, sealing portion 270 can provide and airtight and/or watertight seal around equipment 10, thereby preventing or reducing the amount of air, water, dirt, and/or debris that can penetrate carrier box 200 during storage and/or transport of equipment 10.

In some embodiments, sealing portion 270 is disposed on a front end 202 of carrier box 200 that is facing equipment holder 400 (see, e.g., FIG. 1). In some embodiments, carrier box 200 can include two sealing portions 270, where the first sealing portion 270 is disposed on the front end 202 of carrier box 200 that is facing equipment holder 400, and the second sealing portion 270 is disposed on the rear end 204 of carrier box 200 opposite the first sealing portion 270, such that a seal is provided where equipment both enters and exits carrier box 200 (see, e.g., FIG. 5).

In some embodiments, when carrier box 200 is in a closed position, sealing portion 270 can prevent first and/or second compartment spaces 212, 232 from being visible from the exterior of the carrier box 200. Since some equipment 10 that can be stored and/or transported in equipment carrier 100 can be quite valuable (such as, for example, a fishing reel 16), preventing the ability to see into the carrier box 200 can reduce the chance of theft of equipment 10. As mentioned above, the carrier box 200 can also be locked in the closed position, which again can reduce the chance of theft of equipment 10.

With reference to FIG. 1, in some embodiments, sealing portion 270 can include several separate seal members 272 configured to provide a seal between equipment 10 and carrier box 200. Each seal member 272 can, for example, correspond to a single piece of equipment 10 extending though sealing portion 270. Using one continuous sealing portion 270 can create gaps between equipment 10 and sealing portion 270. For example, if a fishing rod 12 with a small diameter is disposed between two fishing rods 12 with large diameters, the large diameter rods 12 can create tension in sealing portion 270 that causes sealing portion 270 to pull away from the small diameter rod 12. This can create gaps between sealing portion 270 and the small diameter rod 12, which can allow air, water, and/or debris, for example, to enter carrier box 200. Thus, by using several discrete seal members 272, tension in a first seal member 272 created by a large diameter rod 12, for example, will not create tension in a second seal member 272 disposed adjacent to the first seal member 272. In this manner, a gapless seal can be formed around each equipment 10 extending through sealing portion 270.

With reference to FIGS. 6-9, for example, equipment carrier 100 can include a clamp 300, which can be configured to secure equipment 10 during storage and/or transport. In some embodiments, clamp 300 can include a base 310, a first clamping portion 320, and a second clamping portion 360.

Figure 10:
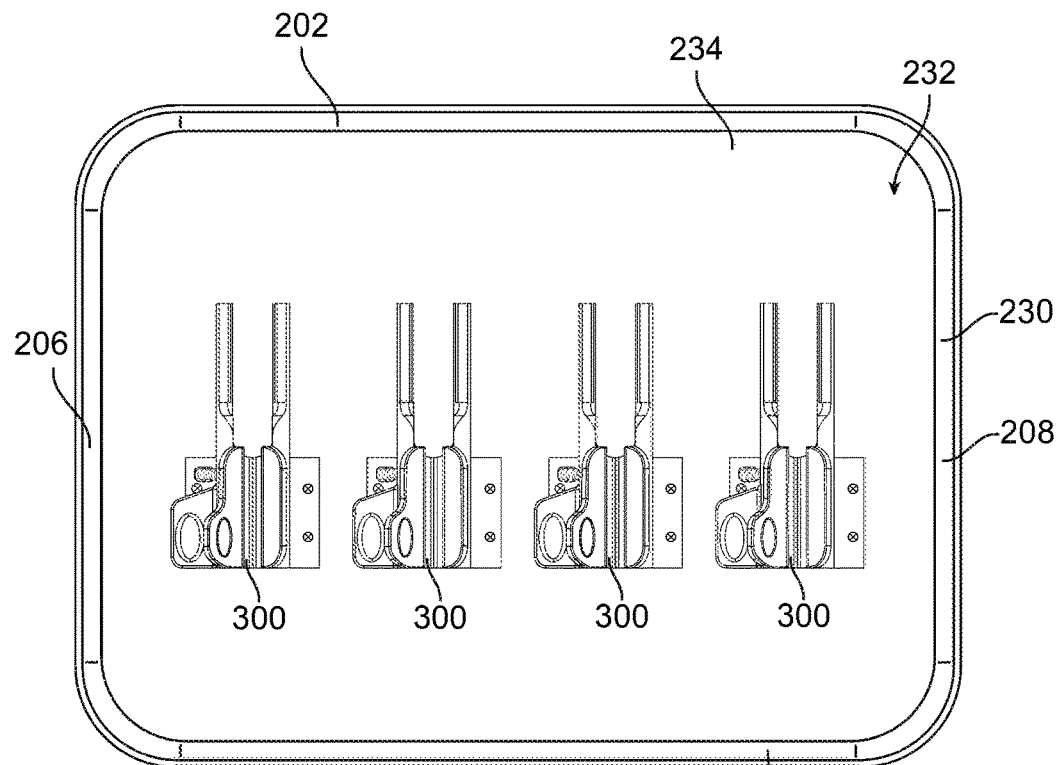
FIG. 10 is a top view of a carrier box according to an embodiment.

In some embodiments, base 310 is disposed in first compartment 232 of carrier box 200. In some embodiments, base 310 is integrally formed with bottom portion 230. In some embodiments, base 310 is coupled to an inner surface 234 of bottom portion 230. In some embodiments, a user can adjust the position of base 310 on bottom portion 230. As shown in FIG. 10, for example, several clamps 300 can be disposed in carrier box 200, for example, one, two, three, four, or more clamps. As shown in FIG. 11, for example, in some embodiments, one or more clamp 300 can be disposed on a clamp positioning rail 260. Each clamp positioning rail 260 can include a slot 262, where a user can adjust the position of clamp 300 along the length of slot 262. Clamp positioning rail 260 can be, for example, a mounting rail, track, mounting track, or the like. Since the position of clamps 300 relative to carrier box 200 can be adjusted, clamps 300 can be configured to store a variety of differently-dimensioned equipment 10, or can be arranged to maximize the amount of equipment 10 that can be stored in carrier box 200. This can also prevent the equipment 10, for example multiple reels 16, from contacting each other.

Figure 26:
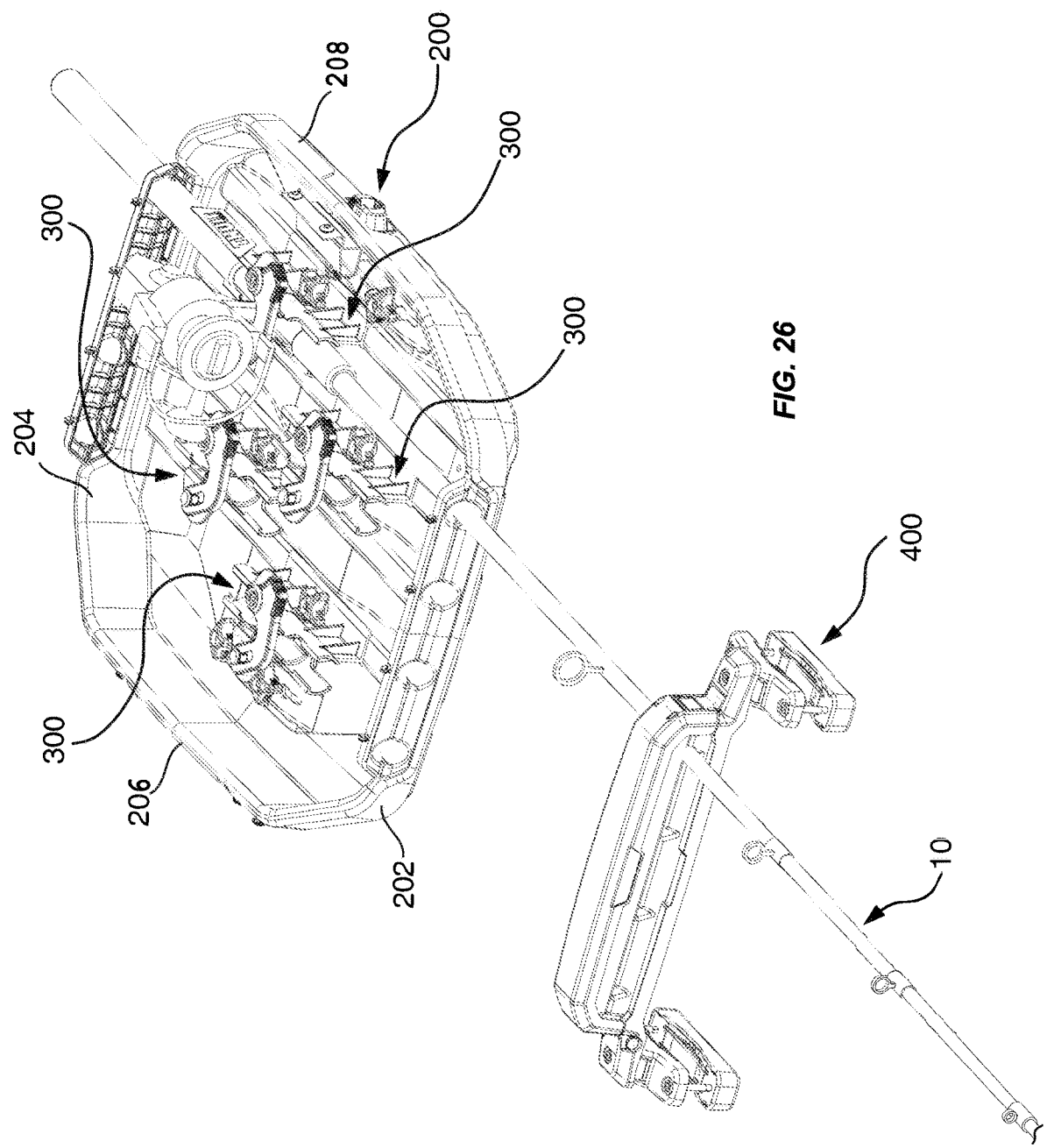
FIG. 26 is a perspective view of an equipment carrier according to an embodiment.
Figure 27:
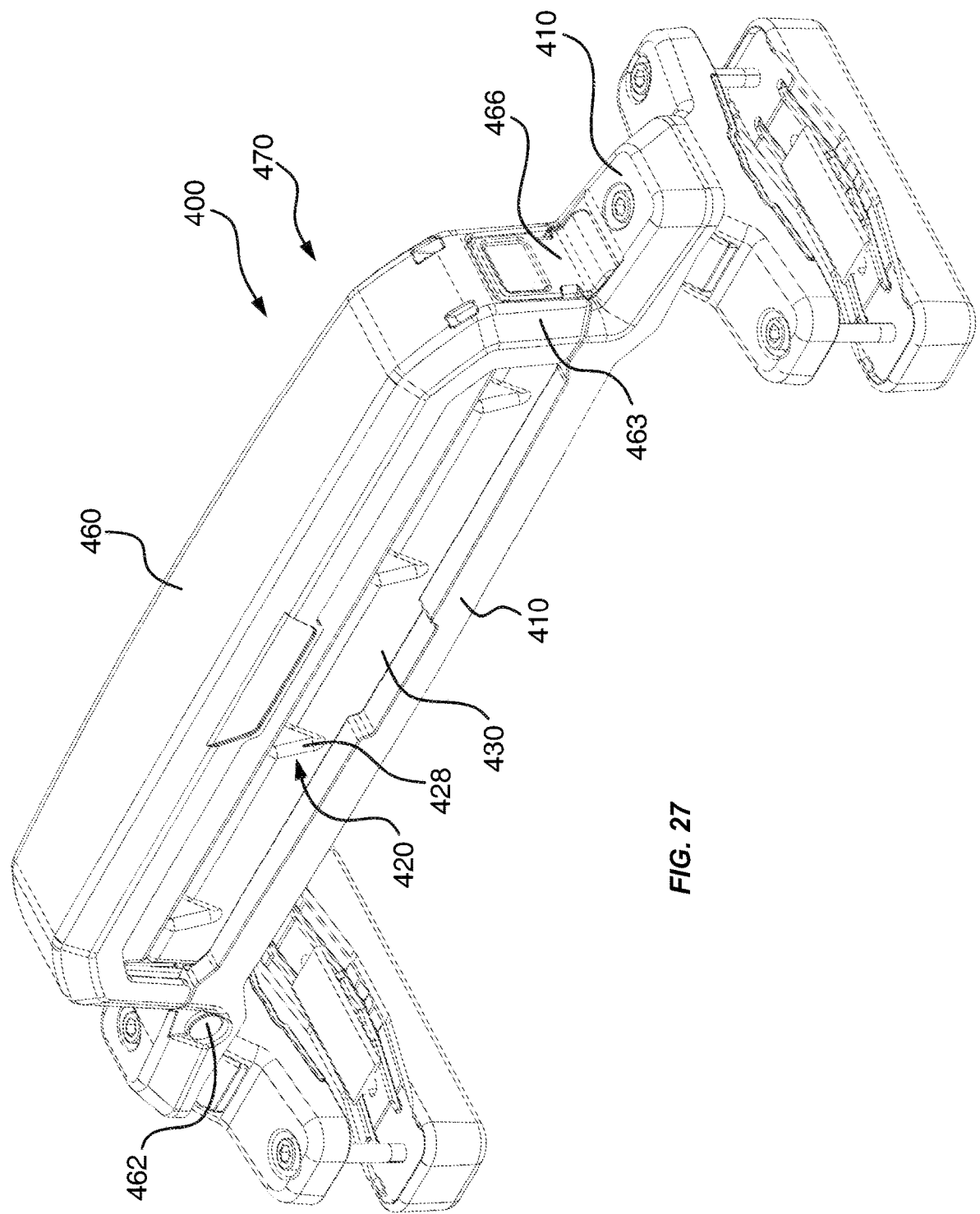
FIG. 27 is a perspective view of an equipment holder according to an embodiment.

In some embodiments, a first clamp can be offset relative to a second clamp along the length of the slot to maximize the amount of equipment that can be stored in the carrier box. Some fishing rods have reels 16 with a line spool having a greater diameter than the rod 12 and handle 15, or additional components (e.g., handle and bail arm) that extend beyond the diameter of the rod 12 and handle 15. This increases the overall width needed to store the fishing rod and can limit the number, shape, and/or size of fishing rods that can fit within a carrier box 200 when clamps 300 are configured linearly (i.e., side by side) as shown, for example, in FIG. 10. However, positioning clamps 300 in a staggered or offset formation, as shown for example in FIGS. 11 and 26, allows for more efficient storage of fishing rods in carrier box 200 since the staggered or offset configuration prevents fishing reels 16 from contacting each other (see FIG. 26). This can reduce the overall width and weight of carrier box 200 for storing a particular number of fishing rods. In some embodiments, clamps 300 can be fixed in the staggered or offset formation. In some embodiments, clamps 300 can be adjustable such that their positions can be moved along a longitudinal direction 242 (e.g., forward and backward) within carrier box 200, for example, along positioning rails 260 as described herein. In some embodiments, for example, as shown in FIGS. 11 and 26, positioning clamps 300 in a staggered or offset formation allows carrier box 200 to store four fishing rods with large reels 16, whereas a standard linear configuration, as shown in FIG. 10, might not allow for the storage of four fishing rods with large reels because the reels might interfere with each other. Instead, a linear configuration of a similarly sized carrier box 200 might only be able to store smaller reels, force the user to detach the reels, or store fewer fishing rods to prevent contact between fishing reels 16. Alternatively, a larger, heavier box might be needed to store the same number of fishing rods.

Base 310 can be secured to carrier box 200 using a variety of different methods. For example, in some embodiments, base 310 can be secured to bottom portion 230 (e.g., to interior surface 234 of the carrier box 200) and/or clamp positioning rail 260 (see, e.g., FIGS. 10-11) using one or more fasteners such as, for example, a screw, bolt, pin, clip, clamp, or the like. In some embodiments, the fasteners can extend through holes in base 310 (see, e.g., FIG. 7) and into receiving holes in bottom portion 230 and/or clamp positioning rail 260 in order to secure base 310 to bottom portion 230 and/or clamp positioning rail 260. In some embodiments, bottom portion 230 and/or clamp positioning rail 260 can include a receiving hole corresponding to and configured to receive each of the fasteners used to secure clamp 300 to bottom portion 230 and/or clamp positioning rail 260. In some embodiments, bottom portion 230 and/or clamp positioning rail 260 can include several receiving holes corresponding to each of the fasteners used to secure clamp 300 to bottom portion 230 and/or clamp positioning rail 260. In this manner, the position of clamp 300 relative to bottom portion 230 and/or clamp positioning rail 260 can be adjusted, for example, by securing clamp 300 to receiving holes at different positions. In some embodiments, base 310 can include protrusions (e.g., integrally-formed protrusions) that can be received by receiving holes in bottom portion 230 and/or clamp positioning rail 260. In some embodiments, clamp 300 can be secured to bottom portion 230 and/or clamp positioning rail 260 using a quick release mechanism such as, for example, a clamp or a lever actuated cam that secures base 310 to bottom portion 230 and/or clamp positioning rail 260 by providing a clamping force. In some embodiments, a tool can be needed to secure clamp 300 to, and/or release clamp 300 from, bottom portion 230 and/or clamp positioning rail 260. In some embodiments, no tool is needed to secure clamp 300 to or release clamp 300 from bottom portion 230 and/or clamp positioning rail 260. As mentioned above, in some embodiments, base 310 can be integrally formed with bottom portion 230 (e.g., using an injection molding or thermoforming process) and its position cannot be adjustable relative to bottom portion 230.

In some embodiments, bottom portion 230 can include a removable interior portion (e.g., interior surface 234) on which clamp positioning rails 260 and/or clamps 300 can be secured. The removable interior portion can be, for example, a substantially planar member that can be placed in and/or secured within second compartment space 232. In this manner, a user can remove the removable interior portion in order to, for example, adjust the position of clamps 300 without having to reach above vehicle 20. A user can also load equipment 10 into clamps 300 or unload equipment 10 from clamps 300 with the removable interior portion removed from bottom portion 230, which can make loading and/or unloading equipment 10 easier for the user. Similarly, a user can remove the removable interior portion, for example, in order to store or transport equipment 10 without having to unload equipment 10 from clamps 300. In some embodiments, the removable interior portion can include a handle or a hole, for example, where the user can grip the removable interior portion in order to remove and/or carry the removable interior portion. In some embodiments, the removable interior portion can be lockable to bottom portion 230.

In some embodiments, base 310 can be configured to be disposed directly on a vehicle rack or directly on vehicle 20 (e.g., on the vehicle roof or on the surface of a truck bed). In some embodiments, base 310 can be configured to be disposed on a piece of equipment that is secured to the vehicle (e.g., a roof-mounted tent or a hitch-mounted carrying apparatus).

With reference to FIGS. 6-9, in some embodiments, first clamping portion 320 extends between a first end 322 and a second end 324 and includes an inner surface 330 and an outer surface 334. In some embodiments, first clamping portion 320 extends between first and second ends 322, 324 in a direction that is generally parallel to the direction of extension 14 of equipment 10. In some embodiments, first clamping portion 320 is rotatably coupled to base 310 about a hinge 344 via a base connection member 340 that extends beneath first clamping portion 320. In some embodiments, hinge 344 can be a mechanical hinge. In some embodiments, hinge 344 can be a flexure hinge that operates through the elastic deformation or certain portions (e.g., base connection member 340) of clamp 300. In some embodiments, base connection member 340 is disposed on, coupled to, or integrally formed with outer surface 334.

In some embodiments, inner surface 330 of first clamping portion 320 is concave. In some embodiments, a portion of inner surface 330 is concave. In some embodiments, first clamping portion 320 has a generally semi-cylindrical shape. In some embodiments, first clamping portion 320 includes a generally C-shaped cross section. In some embodiments, first clamping portion 320 includes a linear portion and a curved portion of inner surface 330. In some embodiments, the cross section of first clamping portion 320 varies along the length of first clamping portion 320 between first and second ends 322, 324.

In some embodiments, second clamping portion 360 extends between a first end 362 and a second end 364 and includes an inner surface 370 and an outer surface 374. In some embodiments, second clamping portion 360 extends between first and second ends 362, 364 in a direction that is generally parallel to the direction of extension 14 of equipment 10. In some embodiments, second clamping portion 360 is fixedly coupled to base 310 via a base connection member 380 that extends beneath second clamping portion 360. In some embodiments, base connection member 380 is disposed on, coupled to, or integrally formed with outer surface 374. In some embodiments, second clamping portion 360 is rotatably coupled to base 310 about a hinge (e.g., a mechanical hinge or flexure hinge), for example, as discussed above regarding hinge 344. In some embodiments, the hinge can be connected via base connection member 380. In some embodiments, second clamping portion 360 is integrally formed with base 310.

In some embodiments, inner surface 370 of second clamping portion 360 is concave. In some embodiments, a portion of inner surface 370 is concave. In some embodiments, second clamping portion 360 has a generally semi-cylindrical shape. In some embodiments, second clamping portion 360 includes a generally C-shaped cross section. In some embodiments, second clamping portion 360 includes a linear portion and a curved portion of inner surface 370. In some embodiments, the cross section of second clamping portion 360 can vary along the length of second clamping portion 360 between first and second ends 362, 364.

Figure 6:
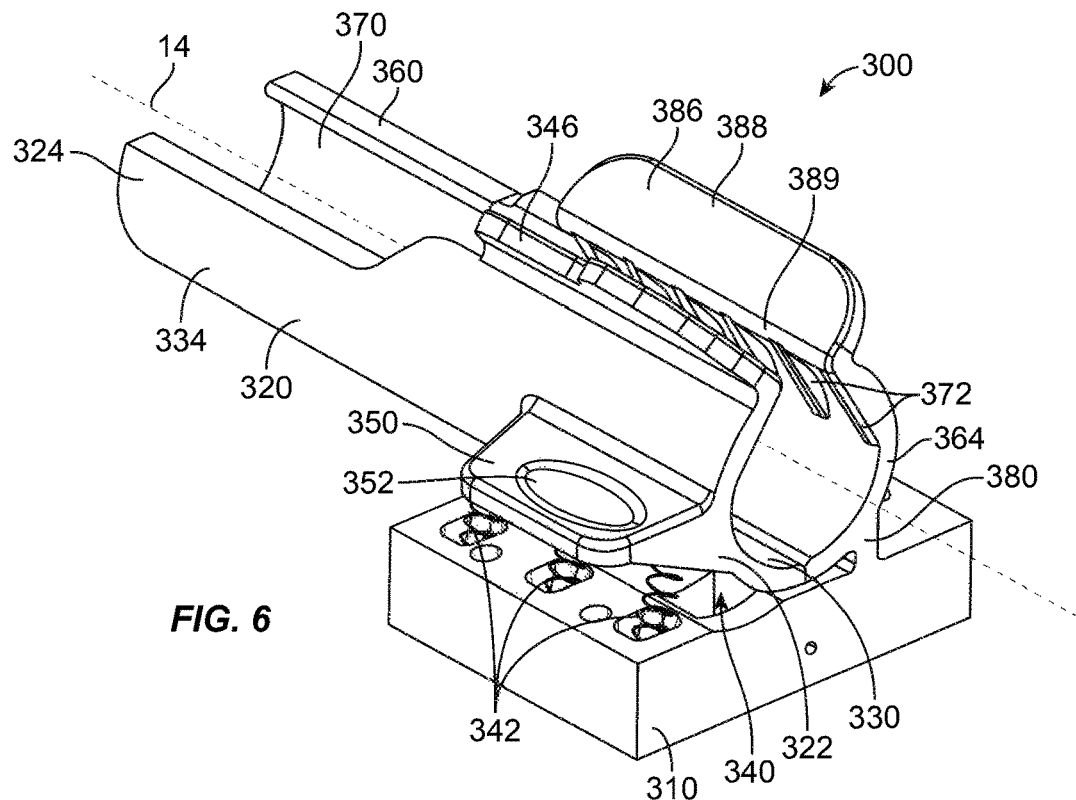
FIG. 6 is a rear perspective view of a clamp according to an embodiment.
Figure 7:
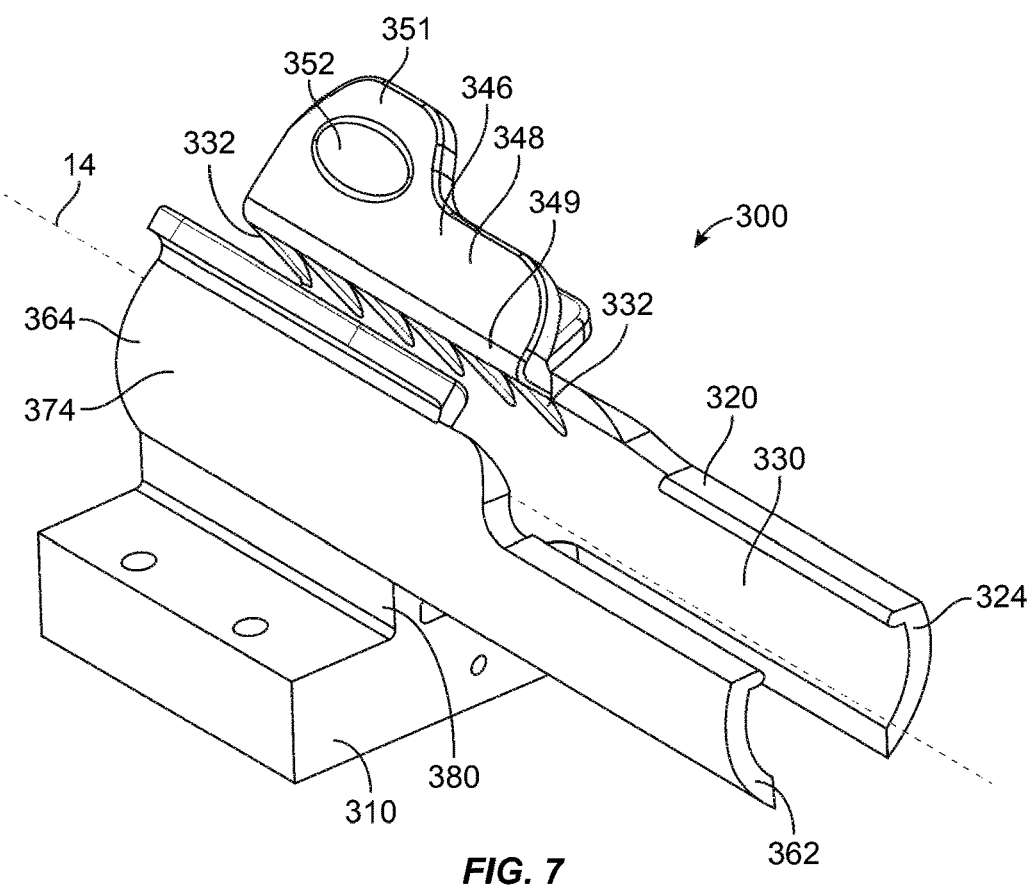
FIG. 7 is a front perspective view of the clamp of FIG. 6.

FIGS. 6 and 7, for example, show clamp 300 in a closed position. In some embodiments, first clamping portion 320 and second clamping portion 360 together form a hollow, generally cylindrical shape. In some embodiments, first clamping portion 320 and second clamping portion 360 together form a generally U-shaped cross section. In some embodiments, in a closed position, an opening 304 is defined between an inner edge 349 of first clamping portion 320 and an inner edge 389 of second clamping portion 360 (see, e.g., FIG. 8). In some embodiments, first clamping portion 320 and second clamping portion 360 together form a generally O-shaped cross section. In some embodiments, in a closed position, inner edges 349, 389 can be in communication with one another and there is no opening between edges 349, 389 (see, e.g., FIG. 13).

As mentioned above, in some embodiments, the cross sections of first and second clamping portions 320, 360 can vary along their lengths. This can, for example, allow one clamp 300 to accommodate many different styles and sizes of fishing rods 12 and fishing reels 16. For example, as shown in FIGS. 6 and 7, the height of first and second clamping portions 320, 360 can decrease from first ends 322, 364 to second ends 324, 362. If, for example, a fishing rod 12 includes a fishing reel 16 that is positioned close to the fishing rod 12 (e.g., using a short reel-to-rod connection 17), the fishing reel 16 can be positioned in clamp 300 near to second ends 324, 362 where there is sufficient clearance for the fishing reel 16. As shown in FIGS. 6 and 7, in some embodiments, near second ends 324, 362 of first and second clamping portions 320, 360 a gap can be formed between the lower portions of first and second clamping portions 320, 360. The gap can, for example, allow the finger rest of a fishing rod 12 to extend downward between first and second clamping portions 320, 360.

Figure 8:
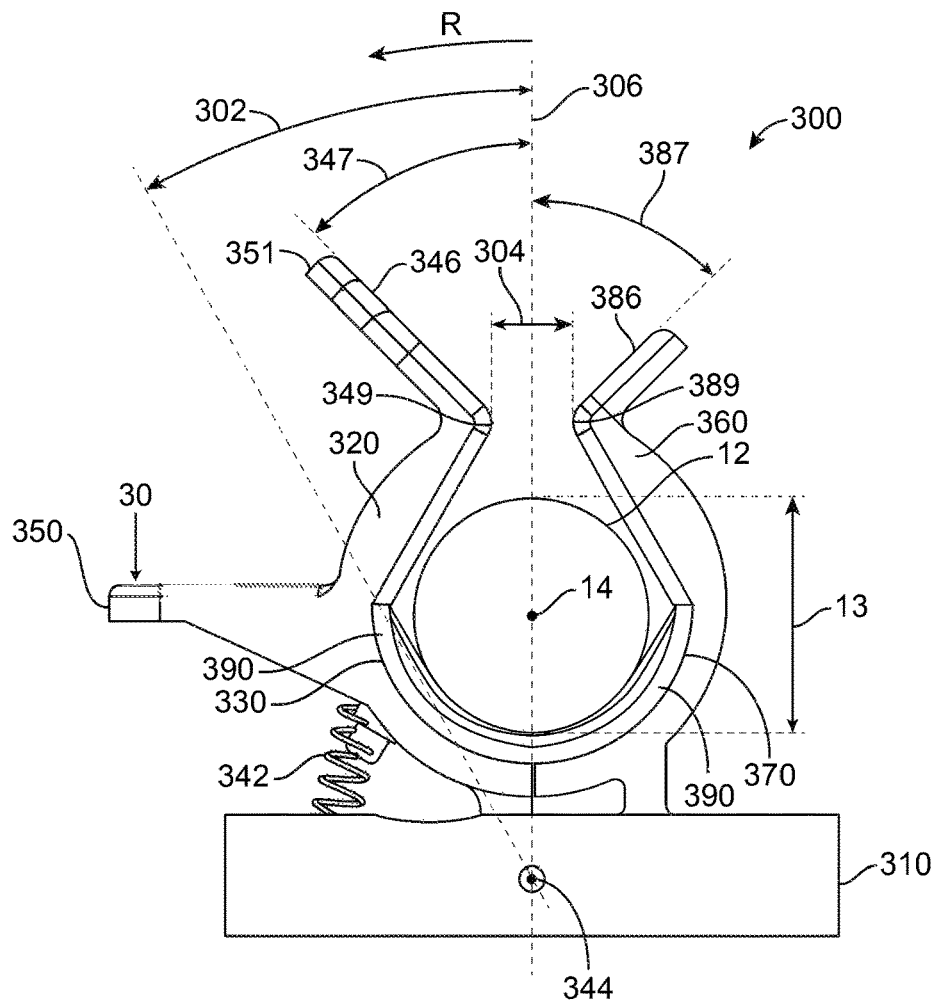
FIG. 8 is a rear view of a clamp according to an embodiment.

FIG. 8 shows a rear view of a clamp 300 in a closed position with a fishing rod 12 disposed in the clamp. In some embodiments, first clamping portion 320 can be rotated in a direction of rotation R from a closed position to an open position about hinge 344. In the closed position, for example, fishing rod 12 can be secured in clamp 300. In the open position, for example, first clamping portion 320 can be rotated away from second clamping portion 360 such that fishing rod 12 can be placed in or removed from clamp 300 via opening 304. The difference in angle of first clamping portion 320 in the closed position and the open position can define an angle of rotation 302. In some embodiments, angle of rotation 302 is the maximum angle that first clamping portion 320 can be rotated about hinge 344. In some embodiments, angle of rotation 302 is less than the maximum angle that first clamping portion 320 can be rotated about hinge 344, which is to say that first clamping portion 320 need not be rotated to the maximum angle for clamp 300 to be in the open position. In some embodiments, angle of rotation 302 can be between approximately 20 and approximately 60 degrees. In some embodiments, angle of rotation 302 is between approximate 30 and approximately 50 degrees. In some embodiments, angle of rotation 302 can be sufficiently large such that opening 304—when the clamp is in the open position—is at least slightly greater than a diameter 13 of fishing rod 12, thereby allowing the fishing rod 12 to be placed in or removed from clamp 300 via opening 304.

In some embodiments, clamp 300 includes a biasing member 342 configured to provide a biasing force to first clamping portion 320. Biasing member 342 can be, for example, a spring, torsional spring, or another biasing mechanism configured to provide a biasing force. In some embodiments, biasing member 342 is a spring and is disposed between base 310 and outer surface 334 of first clamping portion 320 (see, e.g., FIG. 8). In some embodiments, biasing member 342 is a torsional spring and is disposed in base 310. In some embodiments, clamp 300 can include more than one biasing members 342, for example, two, three, or more biasing members. In some embodiments, clamp 300 can be internally biased by its own elastic properties. For example, in some embodiments, elastic deformation of certain portions of clamp 300 can provide a biasing force to first clamping portion 320.

Biasing member 342 can, for example, bias first clamping portion 320 to rotate about hinge 344. Biasing member 342 can bias first clamping portion 320 toward second clamping portion 360 and toward the closed position. In this manner, when equipment 10 is placed between first clamping portion 320 and second clamping portion 360, first clamping portion 320 can be biased to rotate toward second clamping portion 360, thereby securing equipment 10 between inner surface 330 of first clamping portion 320 and inner surface 370 of second clamping portion 360. In some embodiments, biasing member 342 provides a clamping force of approximately 5-25 pounds of force. In some embodiments, biasing member 342 provides a clamping force of approximately 10-20 pounds of force. In some embodiments, biasing member 342 provides a clamping force of approximately 12 pounds of force.

As mentioned above, in some embodiments, second clamping portion 360 is also rotatably coupled to base 310 about a hinge. In some embodiments, one or more biasing members 342 can also be used to provide a biasing force to second clamping portion 360. In this manner, second clamping portion 360 can be biased to rotate about its hinge toward first clamping portion 320. Thus, when equipment 10 is placed between first clamping portion 320 and second clamping portion 360, first clamping portion 320 can be biased to rotate toward second clamping portion 360 and second clamping portion 360 can be biased to rotate toward first clamping portion 320, thereby securing equipment 10 between inner surface 330 of first clamping portion 320 and inner surface 370 of second clamping portion 360.

In some embodiments, first clamping portion 320 includes a rotation member 350 (e.g., a lever) disposed on, coupled to, or integrally formed with first clamping portion 320. In some embodiments, rotation member 350 is configured to rotate first clamping portion 320 from the closed position to the open position. For example, rotation member 350 can extend outward from first clamping portion 320. In some embodiments, a force 30 (applied in a direction normal to the rotation member, for example) causes the first clamping portion 320 to rotate about hinge 344 away from second clamping portion 360 in the direction of rotation R and into the open position. Then, when force 30 is removed, biasing member 342 causes first clamping portion 320 to rotate back toward second clamping portion 360—in a direction opposite to the direction of rotation R—and into the closed position. Rotation member 350 can create a moment about hinge 344, thereby decreasing the force 30 necessary to move first clamping portion 320 against the biasing force of biasing member 342. In this manner, rotation member 350 can make it easier for a user to open and close clamp 300 without decreasing the clamping force provided by biasing member 342. In some embodiments, rotation member 350 can allow a user to easily open and close clamp 300 using only one hand. In some embodiments, rotation member 350 can include a recess 352 configured to make rotation member 350 easier for a user to grip. In some embodiments, rotation member 350 can include a gripping material or a textured surface configured to make rotation member 350 easier for a user to grip.

As shown in FIGS. 6-9, for example, first clamping portion 320 can include a first wing portion 346 disposed along, coupled to, or extending from inner edge 349. Likewise, in some embodiments, second clamping portion 360 can include a second wing portion 386 disposed along inner edge 389. In some embodiments, first wing portion 346 can extend in a first direction defined by an angle 347 and second wing portion 386 can extend in a second direction defined by an angle 387. Angles 347, 387 can be defined as the angle between the direction of extension of first and second wing portions 346, 386 and the vertical axis 306, respectively. In some embodiments, angle 347 can be between approximately 30-60 degrees. In some embodiments, angle 347 can be between approximately 40-50 degrees. In some embodiments, angle 347 can be approximately 45 degrees. In some embodiments, angle 387 can be between approximately 30-60 degrees. In some embodiments, angle 387 can be between approximately 40-50 degrees. In some embodiments, angle 387 can be approximately 45 degrees. In some embodiments, angles 347, 387 can be equal or approximately equal. In some embodiments, angles 347, 387 may be different. In some embodiments, first wing portion 346 and second wing portion 386, together, can form a general V-shape above opening 304. In some embodiments, first wing portion 346 and second wing portion 386 can be planar. In some embodiments, first wing portion 346 and second wing portion 386 are approximately parallel with base 310.

In some embodiments, first wing portion 346 can include an angled surface 348. Likewise, in some embodiments, second wing portion 386 can include an angled surface 388. In some embodiments, first and second wing portions 346, 386 can be configured such that when a user presses fishing rod 12 against angled surface 348 and/or angled surface 388, first clamping portion 320 rotates from the closed position to the open position. In this manner, a user can move clamp 300 from the closed position to the open position without having to manually open clamp 300, which can make loading the equipment into clamp 300 easier for a user.

As discussed above with respect to rotation member 350, in some embodiments, first wing portion 346 can be gripped by a user and used to move first clamping portion 320 from the closed position to the open position. For example, first wing portion 346 can create a moment about hinge 344, thereby decreasing the force necessary to move first clamping portion 320 against the biasing force of biasing member 342, and thereby making it easier for a user to open and close clamp 300 without decreasing the clamping force provided by biasing member 342. In some embodiments, first wing portion 346 can allow a user to easily open and close clamp 300 using only one hand. In some embodiments, first wing portion 346 can include an extending portion 351 that extends further in the first direction defined by angle 347 than other portions of first wing portion 346. Extending portion 351 can be, for example, configured to make first wing portion 346 easier for a user to grip by, for example, increasing the surface area where the user can grip first wing portion 346. In some embodiments, first wing portion 346 can include a recess 352 configured to make first wing portion 346 easier for a user to grip. In some embodiments, first wing portion 346 can include a gripping material or a textured surface configured to make first wing portion 346 easier for a user to grip. In some embodiments, recess 352 and/or gripping material can be disposed on extending portion 351.

In some embodiments, first clamping portion 320 can include one or more angled removal members 332 disposed on, coupled to, or integrally formed with inner surface 330. Likewise, in some embodiments, second clamping portion 360 can include angled removal members 372 disposed on, coupled to, or integrally formed with inner surface 370. In some embodiments, angled removal members 332, 372 can include, for example, several raised ridges that extend at an angle beneath opening 304. In some embodiments, angled removal members 332, 372 can provide a substantially flat or convex profile on the inner surfaces 330, 370 of first and second clamping portions 320, 360 such that fishing rod 12 can be easily removed from clamp 300. For example, in some embodiments, angled removal members 332, 372 can be configured such that when a user presses fishing rod 12 against angled removal members 332, 372, first clamping portion 320 rotates from the closed position to the open position. In this manner, a user can move clamp 300 from the closed position to the open position without having to manually open clamp 300, which can make removing fishing rod 12 from clamp 300 easier for a user.

As shown in FIG. 8, for example, in some embodiments, clamp 300 can include padding 390 disposed on one or both of inner surfaces 330, 370 of first and second clamping portions 320, 360. Padding 390 can be configured, for example, to provide cushioning and/or grip between clamp 300 and fishing rod 12. Such cushioning and/or grip can, for example, reduce movement and/or vibration of the fishing rod 12 during storage and/or transport, thereby reducing the chance of damage to the fishing rod 12. In some embodiments, only a portion of inner surfaces 330, 370 includes padding. In some embodiments, all of inner surfaces 330, 370 include padding. In some embodiments, angled removal members 332, 372 do not include padding, which can allow for fishing rod 12 to more easily slide against angled removal members 332, 372 as fishing rod 12 is removed from clamp 300.

Figure 9:
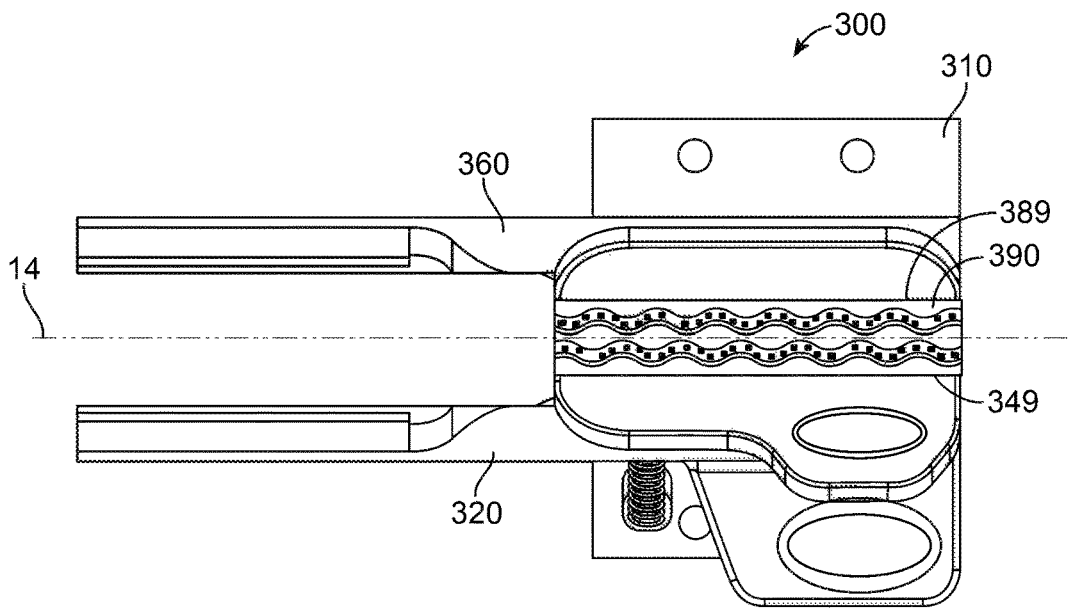
FIG. 9 is a top view of a clamp according to an embodiment.

With reference to FIGS. 5 and 9, for example, in some embodiments, clamp 300 can include padding 390 that extends between inner edge 349 and inner edge 389. In some embodiments, padding 390 can be configured to cushion and/or grip a reel-to-rod connection 17, which connects fishing reel 16 to fishing rod 12. Padding 390 that extends between inner edge 349 and inner edge 389 can, for example, prevent damage to reel-to-rod connection 17 and/or reduce noise caused by vibrations of fishing rod 12 and/or reel 16. In some embodiments, the portion of padding 390 that contacts the reel-to-rod connection 17 can include a non-flat inner surface that can be, for example, wave shaped. The non-flat padding 390 can provide a more secure grip on reel-to-rod connection 17 than if flat padding were used, for example, by increasing the force necessary to move fishing rod 12 in axial direction 14. Although reel-to-rod connection 17 can be securely gripped by padding 390, in some embodiments, a user may still want to make small adjustments to the position of fishing rod 12 without having to remove fishing rod 12 from clamp 300. For example, a user may want to slightly move the fishing rod 12 in an axial direction which can, for example, make it easier for a user to position several fishing rods 12 together inside the carrier box 200 or to make fishing rod 12 correctly positioned to fit in equipment holder 400.

Figure 12:
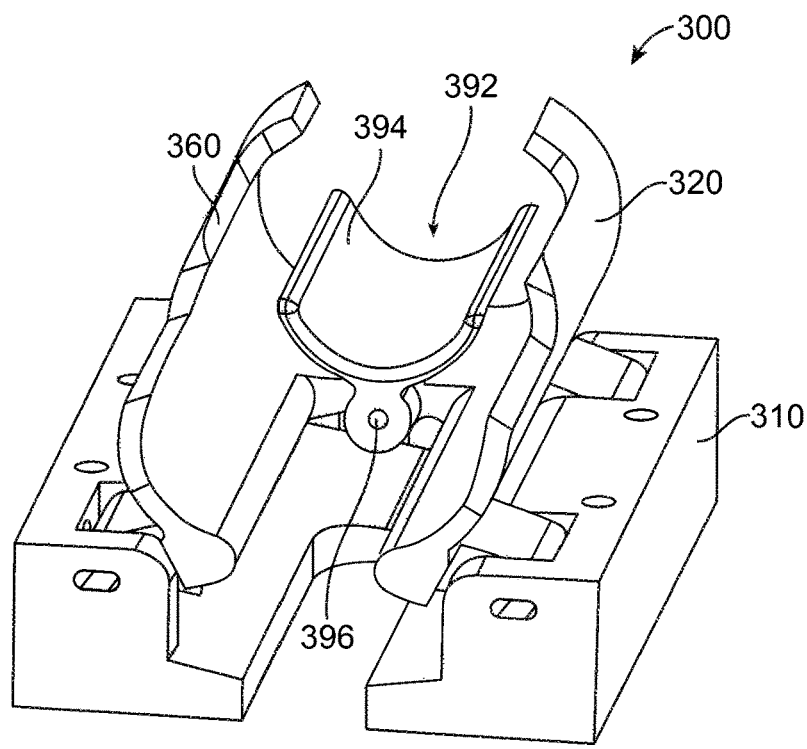
FIG. 12 is a perspective view of a clamp in a first state according to an embodiment.
Figure 13:
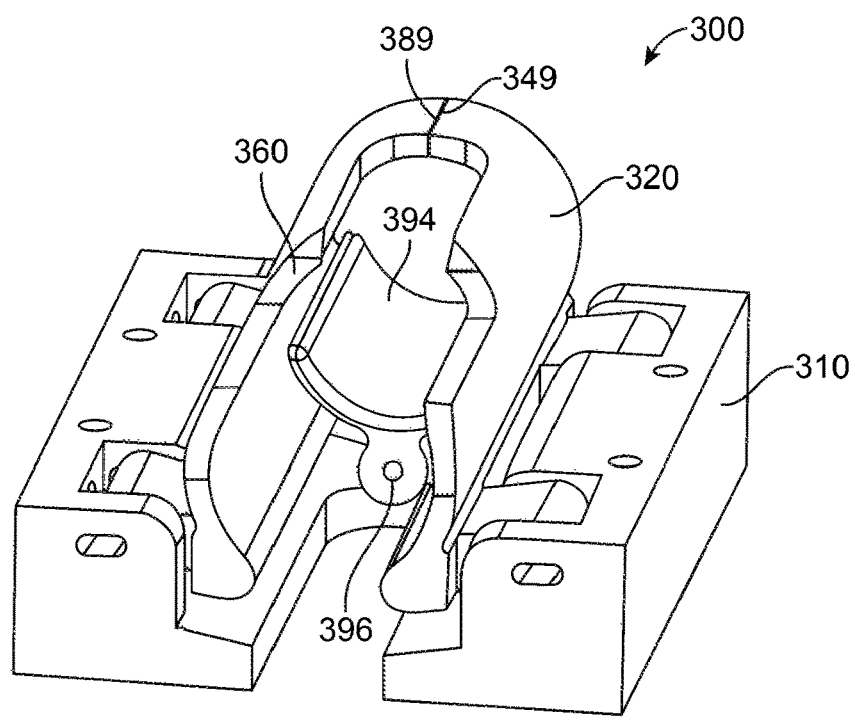
FIG. 13 is a perspective view of the clamp of FIG. 12 in a second state.
Figure 14:
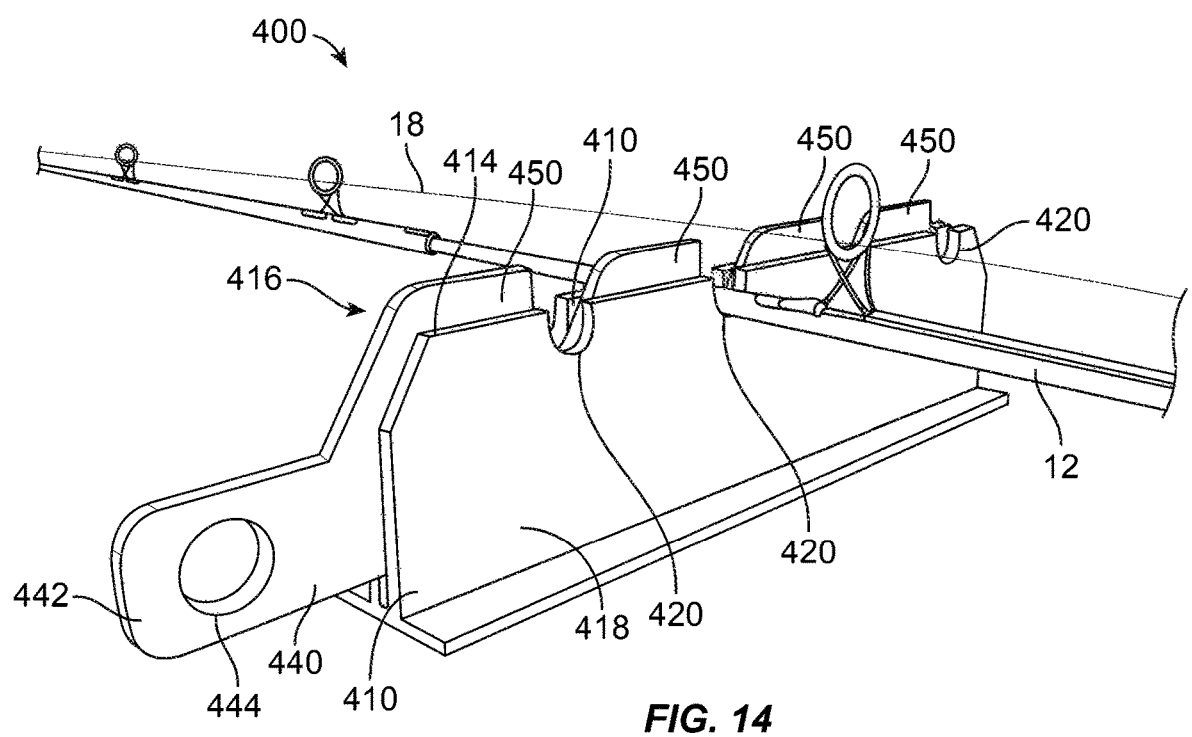
FIG. 14 is a perspective view of an equipment holder according to an embodiment.

In some embodiments, clamp 300 can be internally biased, which is to say that the elastic properties of the clamp itself (or a portion of the clamp) causes clamp 300 to be biased toward the open or the closed position. FIGS. 12 and 13, for example, show such a clamp 300 in an open and a closed position, respectively. In some embodiments, clamp 300 can include first clamping portion 320 and second clamping portion 360, both of which are rotatably connected to base 310. First and second clamping portions 320, 360 can also be rotatably coupled to one another, for example, about a hinge 396. In some embodiments, clamp 300 can include an elastically deformable portion 392 that is configured to elastically deform and to provide an internal biasing force to first and second clamping portions 320, 360. In some embodiments, clamp 300 can include a hinge member 394 configured to receive equipment 10 and configured to move clamp 300 from an open position to a closed position. To close clamp 300, for example, a user can press equipment 10 against hinge member 394. This can cause first and second clamping portions 320, 360 to rotate relative to base 310 and relative to one another, thereby causing portions of elastically deformable portion 392 to elastically deform, and thereby causing an internal biasing force to develop within portions of clamp 300. As a user continues to press equipment 10 against hinge member 394, first and second clamping portions continue to rotate relative to base 310 and to elastically deform until first and second clamping portions snap into a closed position, where equipment 10 can be secured in clamp 300.

With reference to FIGS. 19-25 for example, in some embodiments, second clamping portion 360 can further include a securement latch 510 to couple first clamping portion 320 to second clamping portion 360. In some embodiments, securement latch 510 can further include latching member 512, gripping portion 514, attachment portion 516, and/or neck portion 519. In some embodiments, latching member 512 can include slot 511 to engage a protrusion 540 disposed on first clamping portion 320. In some embodiments, slot 511 can include a plurality of notches or grooves 513 for adjustably engaging protrusion 540 (as shown, for example, in FIG. 23). In some embodiments, slot 511 can have two, three, four, five, six, seven, or, eight notches or grooves 513. In some embodiments, slot 511 can have six notches. During engagement, as protrusion 540 passes into each of the plurality of notches 513, first clamping portion 320 rotates about hinge(s) 344 and first clamping portion 320 converges towards second clamping portion 360. Depending which notch or groove 513 engages protrusion 540, securement latch 510 can more securely couple first clamping portion 320 to second clamping portion 360. As described above, biasing member 342 can bias first clamping portion 320 towards second clamping portion 360 and toward the closed position. As first clamping portion 320 is biased from biasing member 342 (i.e. torsion spring 343), first clamping portion 320 rotates about hinges 344 towards second clamping portion 360 (as shown, for example, in FIG. 24).

In some embodiments, the arrangement of securement latch 510 and protrusion 540 can be reversed such that securement latch 510 is disposed on first clamping portion 320 and protrusion 540 is disposed on second clamping portion 360.

Figure 19:
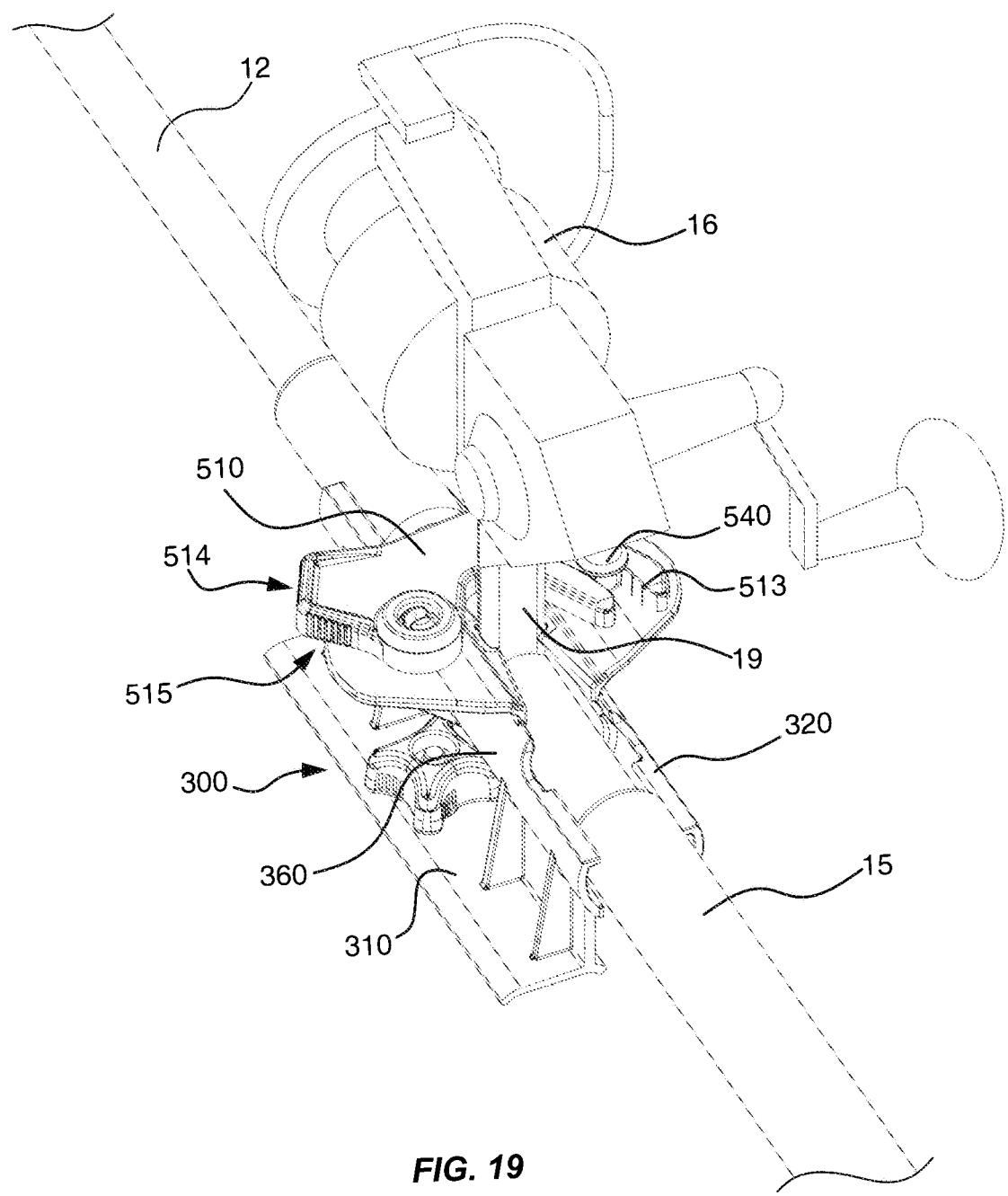
FIG. 19 is a perspective view of a clamp with a fishing rod according to an embodiment.
Figure 21:
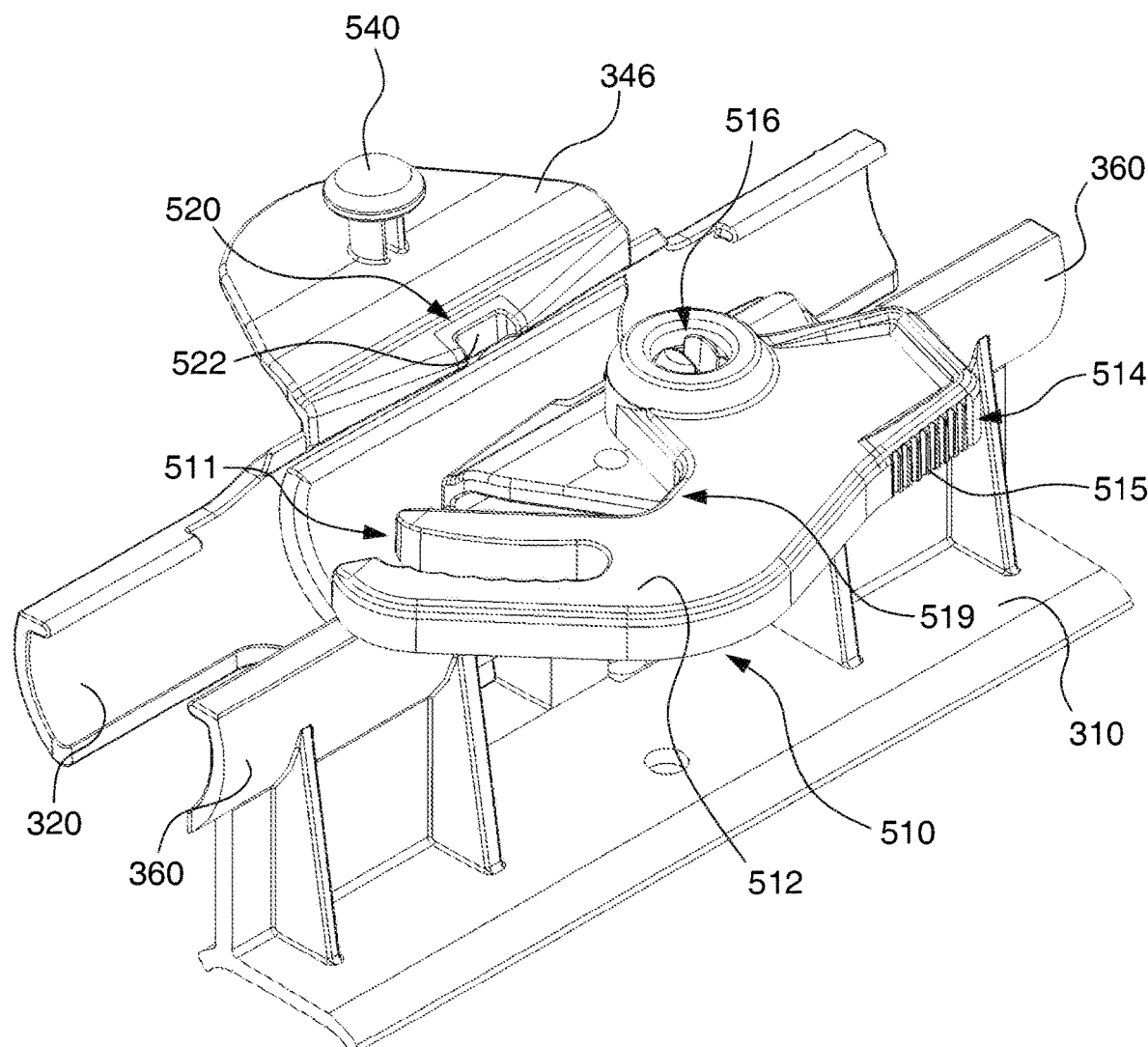
FIG. 21 is a perspective view of a clamp with a securement latch in an open position according to an embodiment.

As shown in FIG. 21, for example, in some embodiments, neck portion 519 allows securement latch 510 to have an arcuate shape such that securement latch 510 engages protrusion 540 without contacting a stem 19 of fishing rod 12 (e.g. as shown in FIG. 19). In some embodiments, securement latch 510 can have a linear shape and be positioned such that it would not contact stem 19 of fishing rod 12 when engaging protrusion 540.

Figure 22:
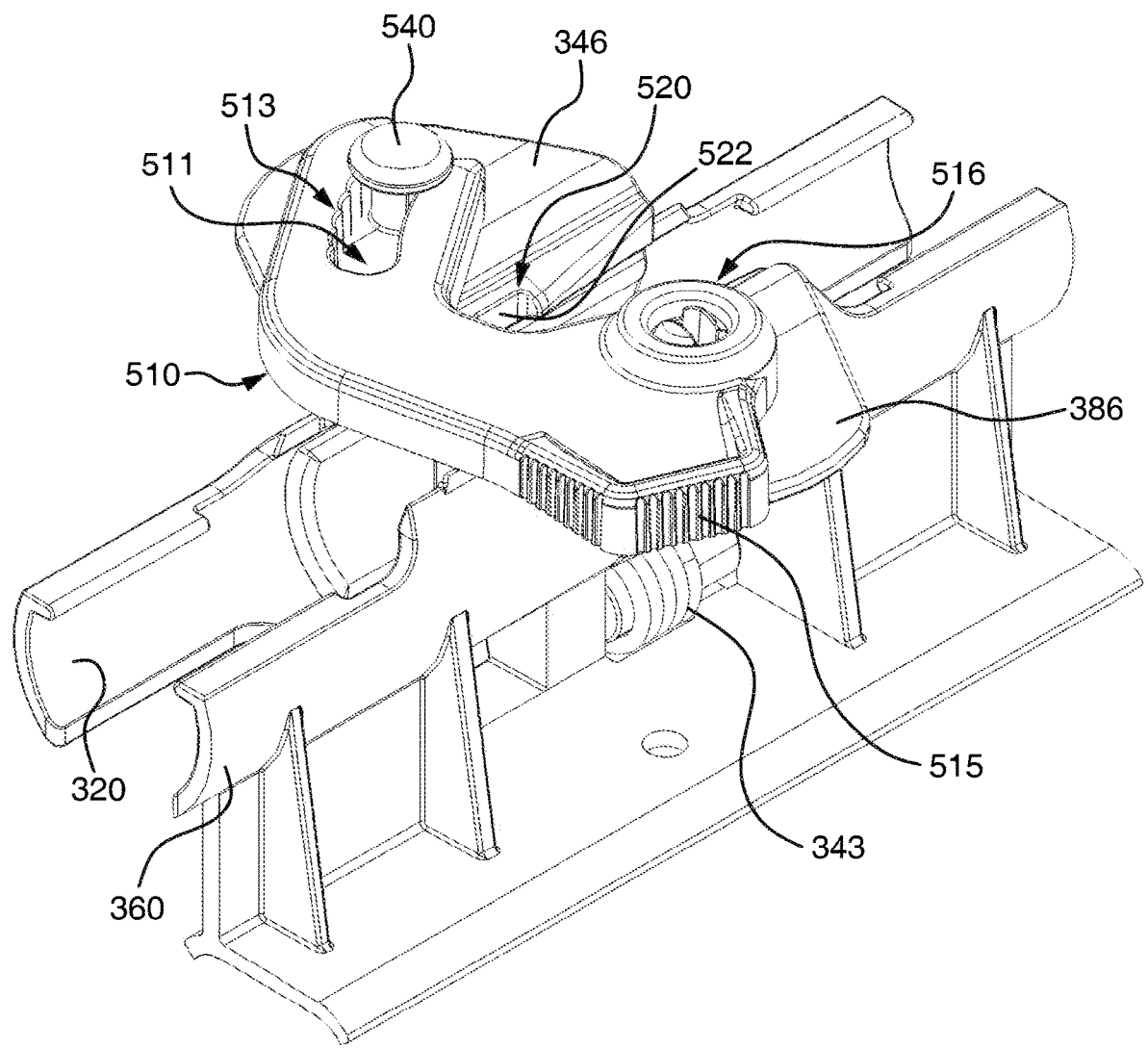
FIG. 22 is a perspective view of a clamp with a securement latch in a closed position according to an embodiment.
Figure 23:
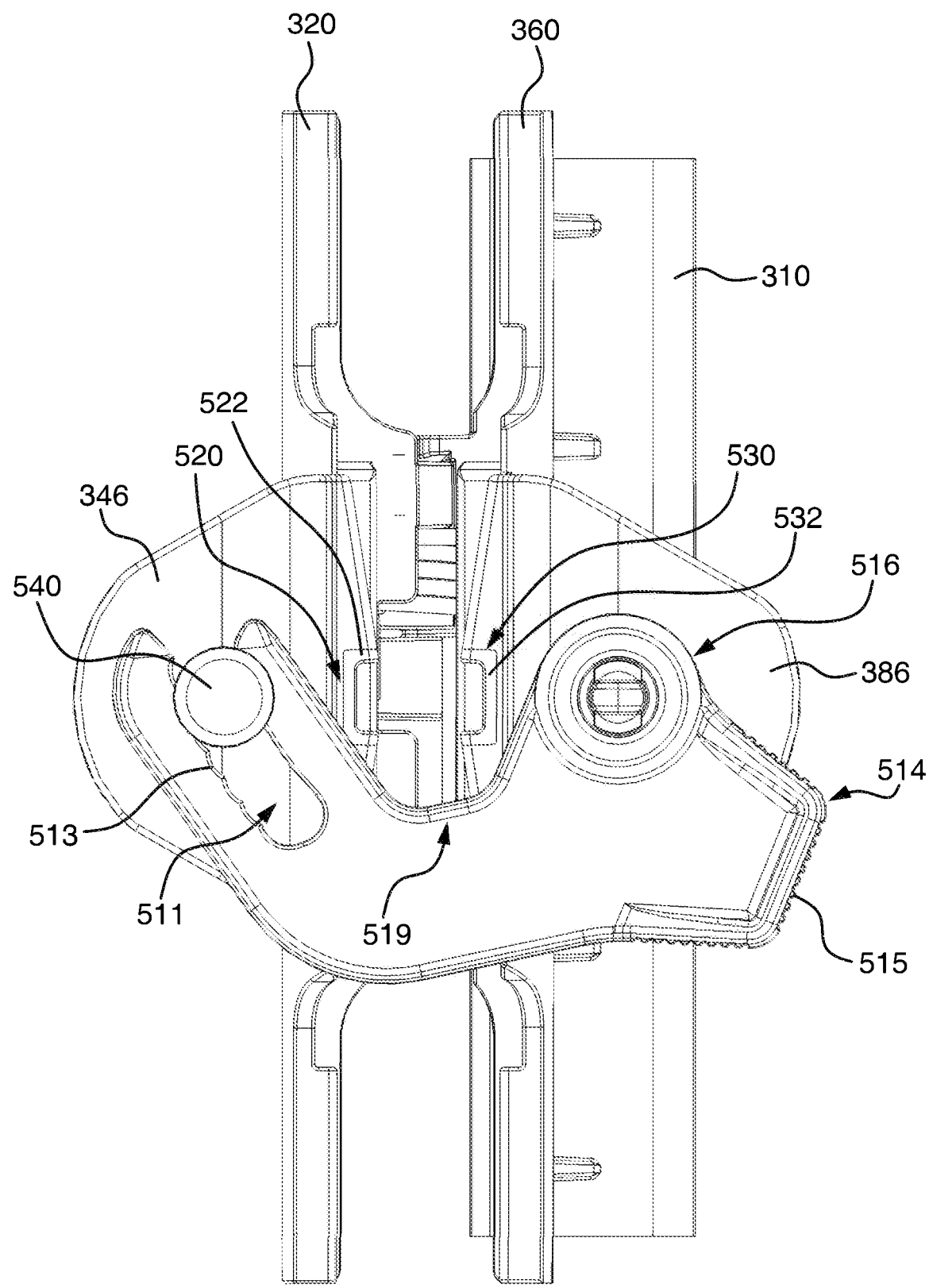
FIG. 23 is a top view of a clamp with a securement latch in a closed position according to an embodiment.
Figure 24:
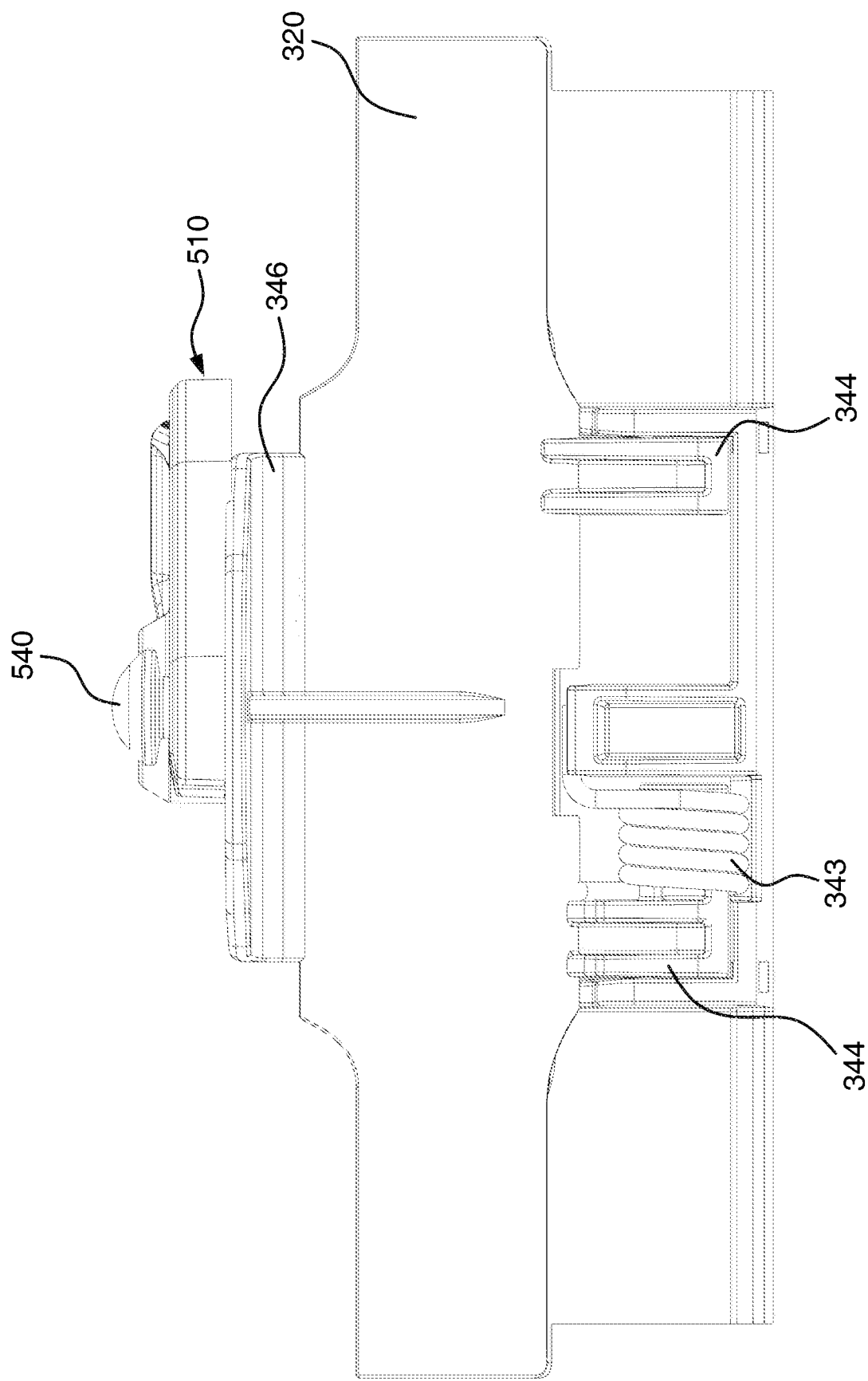
FIG. 24 is a side view of a clamp with a securement latch in a closed position according to an embodiment.
Figure 25:
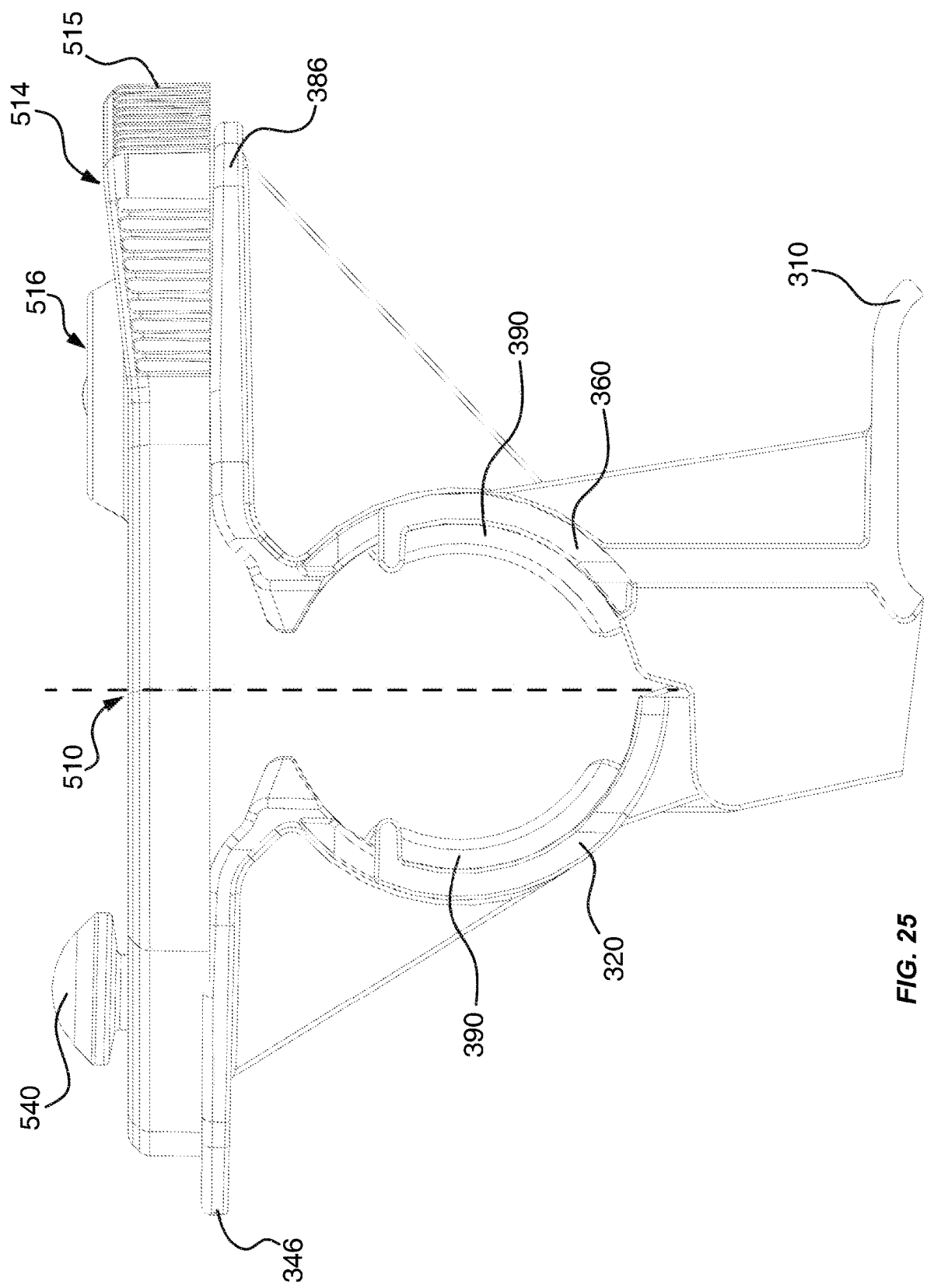
FIG. 25 is a front view of a clamp with a securement latch in a closed position according to an embodiment.

As shown in FIGS. 21-23, for example, in some embodiments, securement latch 510 can include gripping portion 514. In some embodiments, gripping portion 514 can be disposed at an end of securement latch 510 that opposite latching member 512. In some embodiments, gripping portion 514 can include a plurality of ribs 515, for example, disposed on each side of gripping portion 514 for increasing the surface area of the gripping portion 514 and providing a textured surface, thus allowing for an easier and more comfortable grip for a user. In some embodiments, gripping portion 514 can be contoured to increase ergonomics for the user. In some embodiments, gripping portion 514 can have a different surface texture than securement latch 510 such that gripping portion 514 can be easily manipulated by a user.

As shown in FIG. 21, for example, in some embodiments, securement latch 510 can be coupled to attachment portion 516, which can be located on or coupled to wing 386 of second clamping portion 360. In some embodiments, securement latch 510 can be coupled to wing 386 by a snap-fit, locks, clamps, hinges, straps, latches, etc. . . . . In some embodiments, securement latch 510 can be rotatable about attachment portion 516 such that securement latch 510 is rotatable between an open position, as shown in FIG. 21, and a closed position, as shown in FIG. 22. As discussed above, biasing member 342 causes first clamping portion 320 to rotate toward second clamping portion 360 and into the closed position. In some embodiments, second clamping portion 360 can be further rotated into a tighter closed position as securement latch 510 engages protrusion 540. In some embodiments, each subsequent notch or groove 513 of securement latch 510 that engages protrusion 540 increases the tightness of the second clamping portion 360 and further closes clamp 300.

As shown in FIG. 21, for example, when the securement latch 510 is in the open position, securement latch 510 can be positioned over wing 386 so that it does not obstruct opening 304, thereby allowing a user to insert a fishing rod 12.

Figure 20:
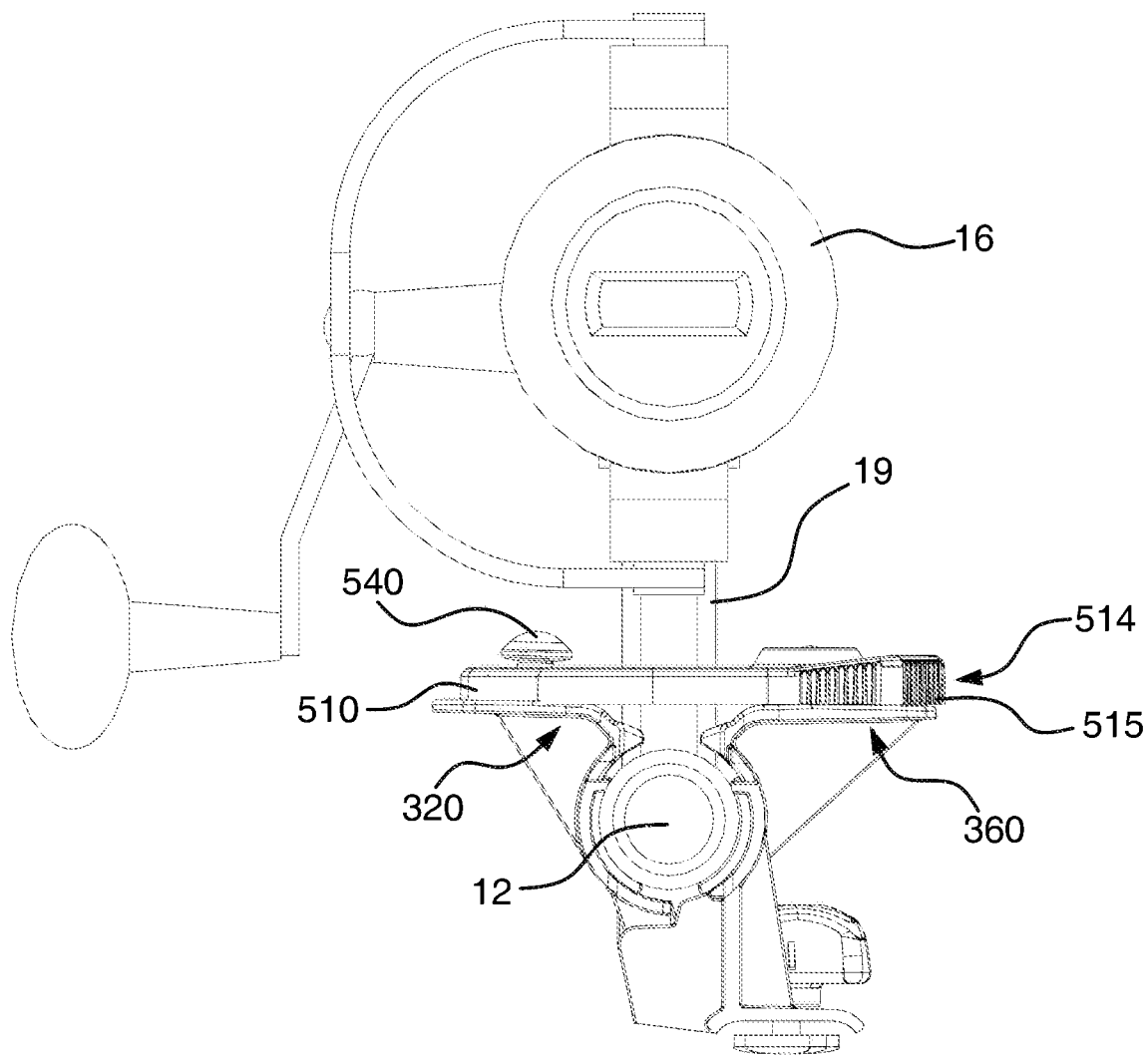
FIG. 20 is front view of a clamp with a fishing rod according to an embodiment.

As shown in FIG. 22, for example, when securement latch 510 is in the closed position, securement latch 510 extends across first clamping portion 320, opening 304, and second clamping portion 360 to engage protrusion 540 of first clamping portion 320. When securement latch 510 engages protrusion 540, protrusion 540 can slide within slot 511 and engage the plurality of notches 513 until first clamping portion 320 is tightly secured to second clamping portion 360. In some embodiments, even upon engaging the furthest notch 513 within slot 511, neck portion 519 does not contact stem 19 of fishing rod 12 (as shown in FIGS. 19-20, for example).

Although FIG. 19 shows securement latch 510 being disposed under reel 16 when securement latch is in the closed position, securement latch 510 can also be configured such that securement latch 510 rotates over handle portion 15 of fishing rod 12 and engages protrusion 540 around the back of the reel stem 19 (i.e., rotating counter-clockwise to the closed position).

As shown in FIG. 23, in some embodiments, first clamping portion 320 and second clamping portion 360 can include first notch 520 and second notch 530, respectively. In some embodiments, first notch 520 and second notch 530 can be disposed opposing one another and configured to surround reel stem 19 of fishing rod 12. In some embodiments, first notch 520 and second notch 530 can contact reel stem 19. As securement latch 510 engages protrusion 540, first clamping portion 320 and second clamping portion 360 converge. Concurrently, the notches 520, 530 can engage reel stem 19 and secure reel stem 19 in place. In some embodiments, first notch 520 and/or second notch 530 can include padding or gripping material 522 and 532, respectively, disposed on a surface of notches 520, 530. The padding or gripping material 522, 532 can be, for example, thermoplastic elastomers (TPE) to reduce the movement and/or vibration of equipment during transport.

In some embodiments, to operate clamp 300 as shown in FIGS. 19-25, a user can rotate securement latch 510 into the open position (see FIG. 21). The user inserts the fishing rod, reel up, into the opening 304 between first clamping portion 320 and second clamping portion 360. Reel stem 19 is positioned within first notch 520 and second notch 530. The user can rotate securement latch 510 into the closed position (see FIG. 19), where securement latch 510 is disposed at least partially around reel stem 19 and engaging protrusion 540. To provide a more secure fit, a user can rotate securement latch 510 such that protrusion 540 engages and passes over several notches or grooves 513, for example, until securement latch 510 cannot be rotated further.

To remove fishing rod 12, a user can rotate securement latch 510 back to the open position, so that protrusion 540 no longer engages any of the notches 513 of securement latch 510. With the securement latch 510 in the open position, the user can lift up on the fishing rod 12 to remove it from the clamp 300. By applying vertical force to the fishing rod 12, first clamping portion 320 will rotate about hinge 344 away from second clamping portion 360 and allow fishing rod 12 to be removed. With fishing rod 12 removed, biasing member 342 causes first clamping portion 320 to rotate back towards second clamping portion 360.

With reference to FIGS. 14-18, in some embodiments, equipment holder 400 can include a base 410 and a locking portion 440. Base 410 can include one or more notches 420 disposed in a top surface 414 of base 410, each of which are configured to receive a fishing rod 12 that can be disposed in and can extend through base 410. Notch 420 can have a width 422 and a depth 424, both of which can have a dimension that is greater than diameter 13 (see FIG. 8) of fishing rod 12.

In some embodiments, locking portion 440 can be disposed between a front surface 416 and a rear surface 418 of base 410, and can be configured to move relative to base 410, for example, in a sliding motion. In some embodiments, base 410 can include slide stops 412 configured to limit the distance that locking portion 440 can slide relative to base 410 (see FIG. 18).

Figure 17:
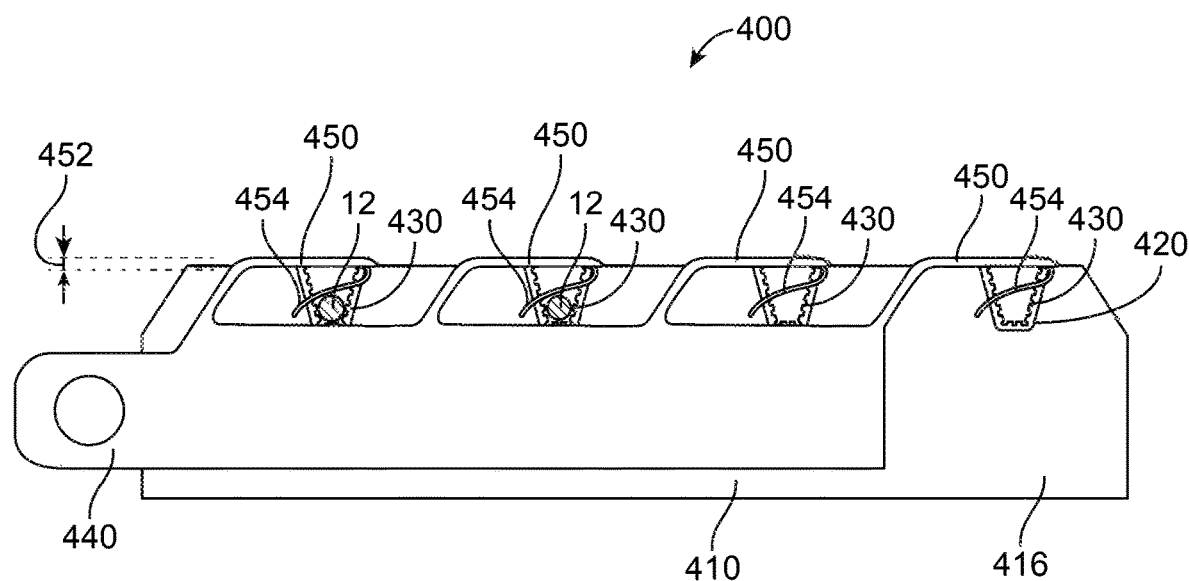
FIG. 17 is a rear view of an equipment holder according to an embodiment.

In some embodiments, locking portion 440 can include a locking member 450 corresponding to a notch 420 that can be movable from an open position to a closed position. In some embodiments, in an open position, locking member 450 does not cover or obstruct an opening 426 of notch 420 such that fishing rod 12 can be inserted into notch 420 via opening 426. In some embodiments, in the closed position, locking member 450 is configured to cover opening 426 of notch 420 such that fishing rod 12 may not be removed from notch 420 via opening 426. In some embodiments, locking member 450 is configured to slide between the open position and the closed position. As shown in FIG. 17, for example, in some embodiments, locking member 450 can include a push-down member 454 that extends beneath locking member 450 at an angle and is configured to push fishing rod 12 in a downward direction as locking member 450 is moved from the open position to the closed position, thereby further securing the fishing rod 12 and reducing the movement of fishing rod 12 during transport. In some embodiments, locking portion 440 is lockable in the closed position.

In some embodiments, a handle 442 can be coupled to locking member 450 such that a user can move (e.g., push or pull) handle 442 in order to move locking member 450 from the open position to the closed position. Other mechanisms can be used to open and close locking member 450, for example, a lever, arm, handgrip, knob, or the like. In some embodiments, a user can open and/or close locking member using for example, a pulling, pushing, and/or a twisting motion. In some embodiments, handle 442 can be disposed on a side of equipment holder 400. In some embodiments where equipment holder 400 is disposed on the roof of a vehicle 20, for example, positioning the handle on the side of equipment holder 400 can make the handle 442 easier for a user to reach and operate while standing next to vehicle 20. In some embodiments, handle 442 can be disposed on the side of equipment holder 400 closer to the driver's side of vehicle 20. In some embodiments, handle 442 can be disposed on the side of equipment holder 400 closer to the passenger's side of vehicle 20. In some embodiments, equipment holder 400 can be reversible, which is to say that equipment holder 400 can be secured to vehicle 20 such that either of front surface 416 or rear surface 418 of base 410 can be disposed closer to front end 22 of vehicle 20. In this manner, a user can select the side of vehicle 20 to which handle 442 is disposed closer and secure equipment holder 400 to vehicle 20 accordingly. In some embodiments, handle 442 can include a gripping element (e.g., hole 444) where a user can grip handle 442.

Figure 15:
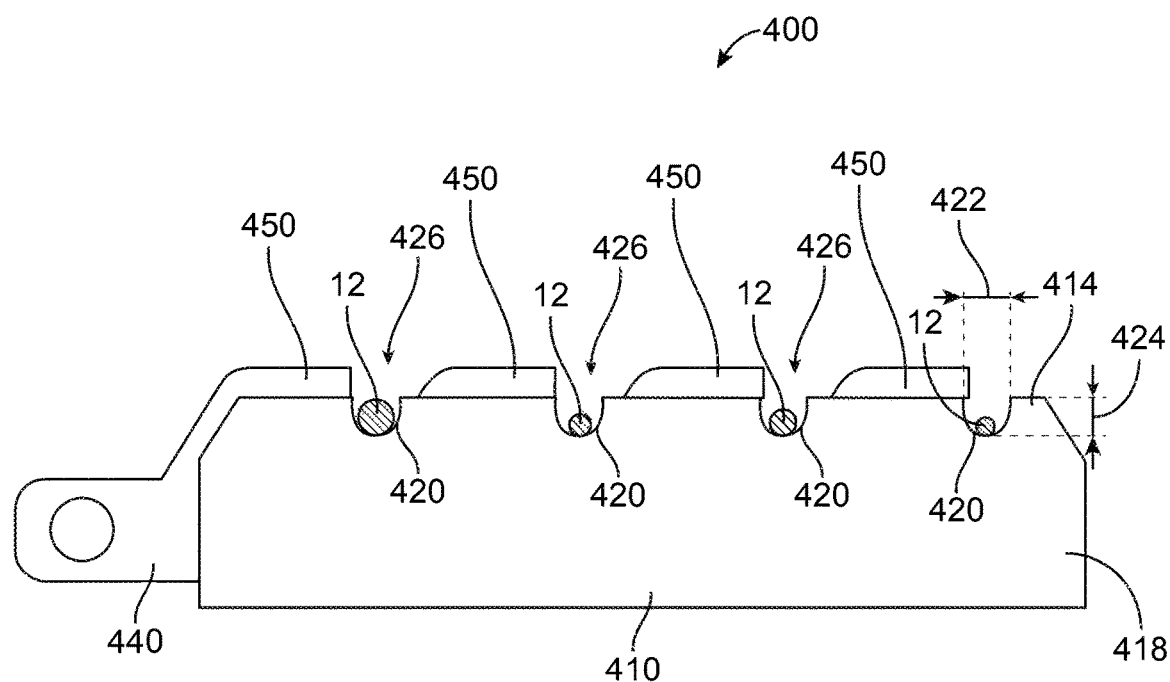
FIG. 15 is a rear view of an equipment holder in a first state according to an embodiment.
Figure 16:
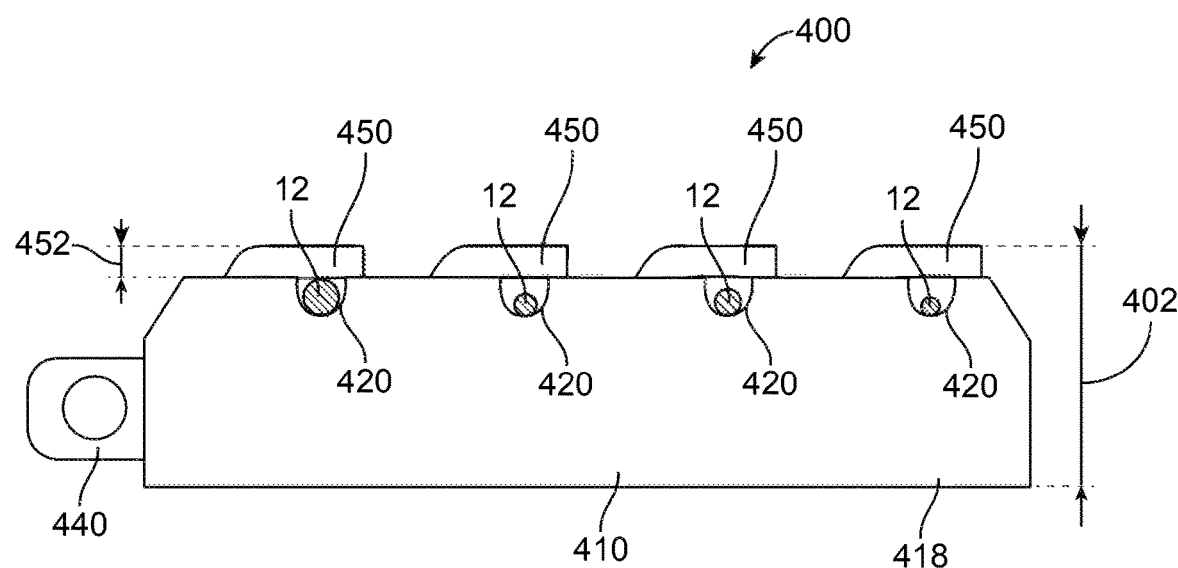
FIG. 16 is a rear view of the equipment holder of FIG. 15 in a second state.

As shown in FIGS. 15 and 16, for example, in some embodiments, base 410 can include several notches 420 and several locking members 450. FIG. 15 shows an equipment holder 400 in an open position and FIG. 16 shows the equipment holder 400 in a closed position. In some embodiments, handle 442 is coupled to each of locking members 450, such that when a user moves handle 442, all of the locking members 450 move from the open to the closed position simultaneously. In this manner, a user can easily secure several fishing rods 12 disposed in notches 420 with one simple movement. Likewise, a user can easily open several notches with one simple movement, and thus can easily load and unload fishing rods 12 without needing to, for example, hold open any portion of equipment holder 400.

Figure 18:
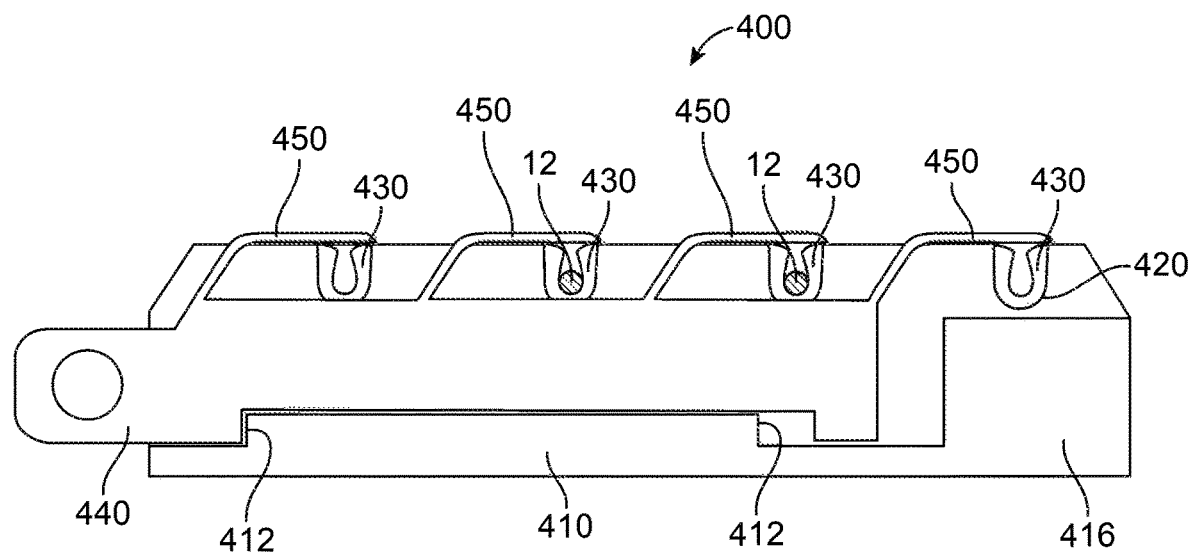
FIG. 18 is a rear view of an equipment holder according to an embodiment.

As shown in FIGS. 17 and 18, for example, in some embodiments, padding 430 can be disposed in notch 420. Padding 430 can be configured, for example, to provide cushioning and/or grip between notch 420 and fishing rod 12. Such cushioning and/or grip can, for example, reduce movement and/or vibration of the fishing rod 12 during storage and/or transport, thereby reducing the chance of damage to the fishing rod 12. In some embodiments, padding 430 can be generally V-shaped and/or can be ribbed (see FIG. 17). In some embodiments, padding 430 can be generally U-shaped and/or can be generally smooth (see FIG. 18). In some embodiments, only a portion notch 420 includes padding. In some embodiments, all of notch 420 includes padding.

As shown in FIGS. 16 and 17, for example, the height 452 of locking members 450 can vary depending on the embodiment. In some embodiments, the height 452 of locking members 450 can be sufficiently thin such that—when in a closed position— locking member 450 extends above fishing rod 12, but beneath a fishing line 18 of fishing rod 12 (see FIG. 14).

As discussed above, equipment carrier 100 can be configured to hold fishing rod 12 and fishing reel 16 in a reel-up configuration. By position fishing rod 12 and reel 16 in a reel-up configuration, the rod can be positioned closer to the bottom of carrier box 200, thereby allowing equipment holder 400 to have a smaller overall height 402 (see FIG. 2) than if the fishing rod 12 and reel 16 were stored in a reel-down configuration (see FIG. 3). In some embodiments, where equipment holder 400 is disposed on the roof of a vehicle 20, for example, a smaller overall height 402 can make it easier for a user to see and/or reach fishing rod 12 and reel 16 when held in equipment carrier 100. Further, a reduced overall height 402 can reduce the aerodynamic drag caused by equipment holder 400, thereby potentially increasing the fuel economy and reducing noise of the vehicle 20 to which equipment holder 400 is attached.

With reference to FIGS. 26-29, in some embodiments, equipment holder 400 can include a base 410 and a lid portion 460. In some embodiments, base 410 can include padding 430 configured to receive a fishing rod 12 that can be disposed on and/or extending through base 410. In some embodiments, padding 430 can be disposed on or coupled to an upper surface of base 410. In some embodiments, padding 430 can be made of, for example, a thermoplastic elastomer (TPE). In some embodiments, the cross-section of padding 430 can vary along its length to form a plurality of fishing rod receptacles 420. In some embodiments, padding 430 can include one or more fishing rod receptacles 420 disposed on a top surface 432 of padding 430 (see FIG. 28). Fishing rod receptacles 420 can have various shapes configured to receive a fishing rod 12. In some embodiments, fishing rod receptacles 420 can form an acute angle 428 (see FIG. 29). This can, for example, allow one fishing rod receptacle 420 to accommodate many different styles and sizes of fishing rods 12. In some embodiments, fishing rod receptacles 420 can have, for example, a circular, arcuate, or rectangular shape. In some embodiments, padding 430 can include a stopper 465 disposed at each end of the padding 430. Stopper 465 can be a protrusion that is raised such that a fishing rod 12 is prevented from sliding out of the equipment holder 400. In some embodiments, base 410 can include releasable fastener 466. Releasable fastener 466 can include, for example, a latch, lever, push-button, magnet, and/or lock. In some embodiments, releasable fastener 466 is a push-button.

Figure 28:
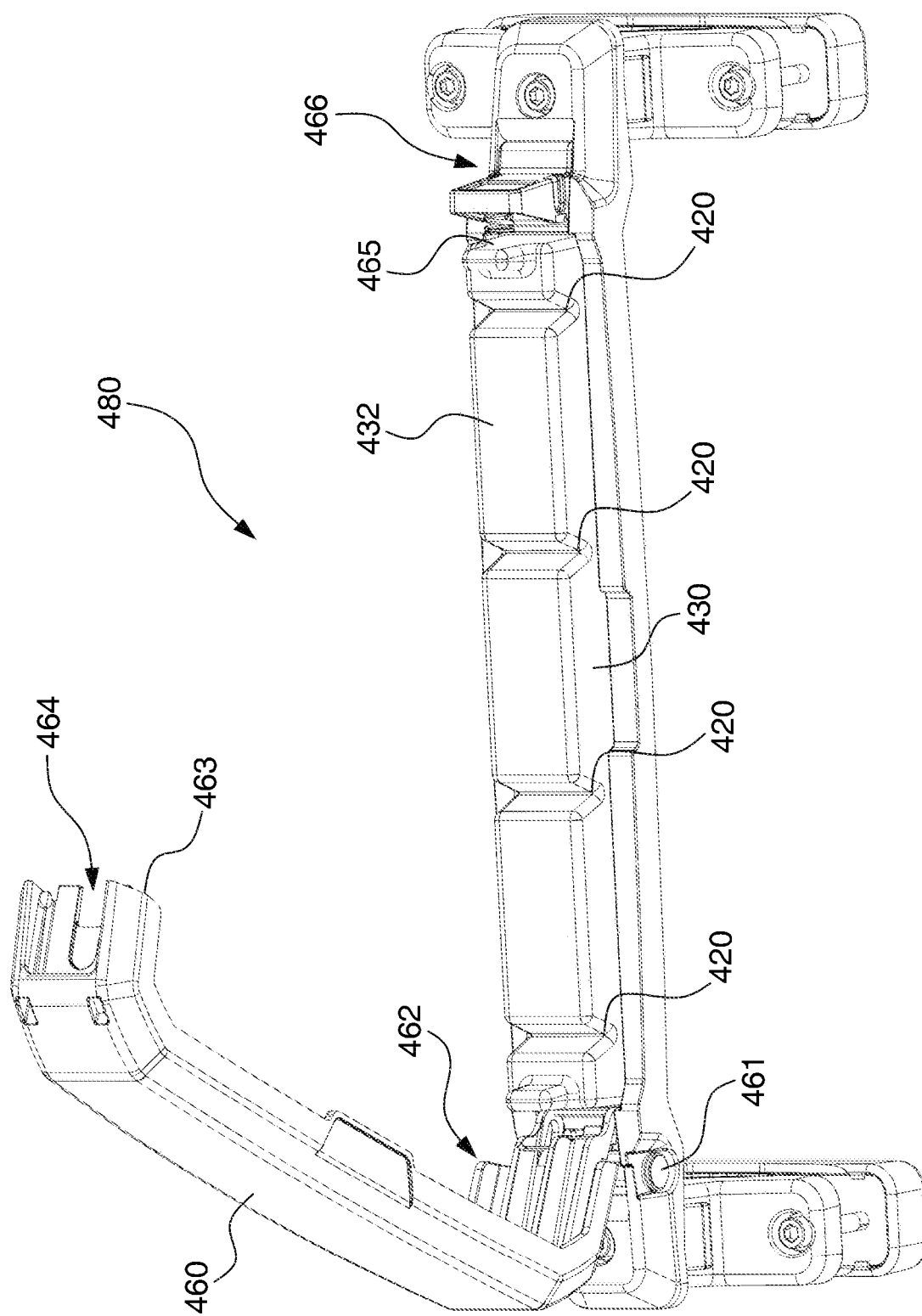
FIG. 28 is a perspective view of an equipment holder in an open position according to an embodiment.
Figure 29:
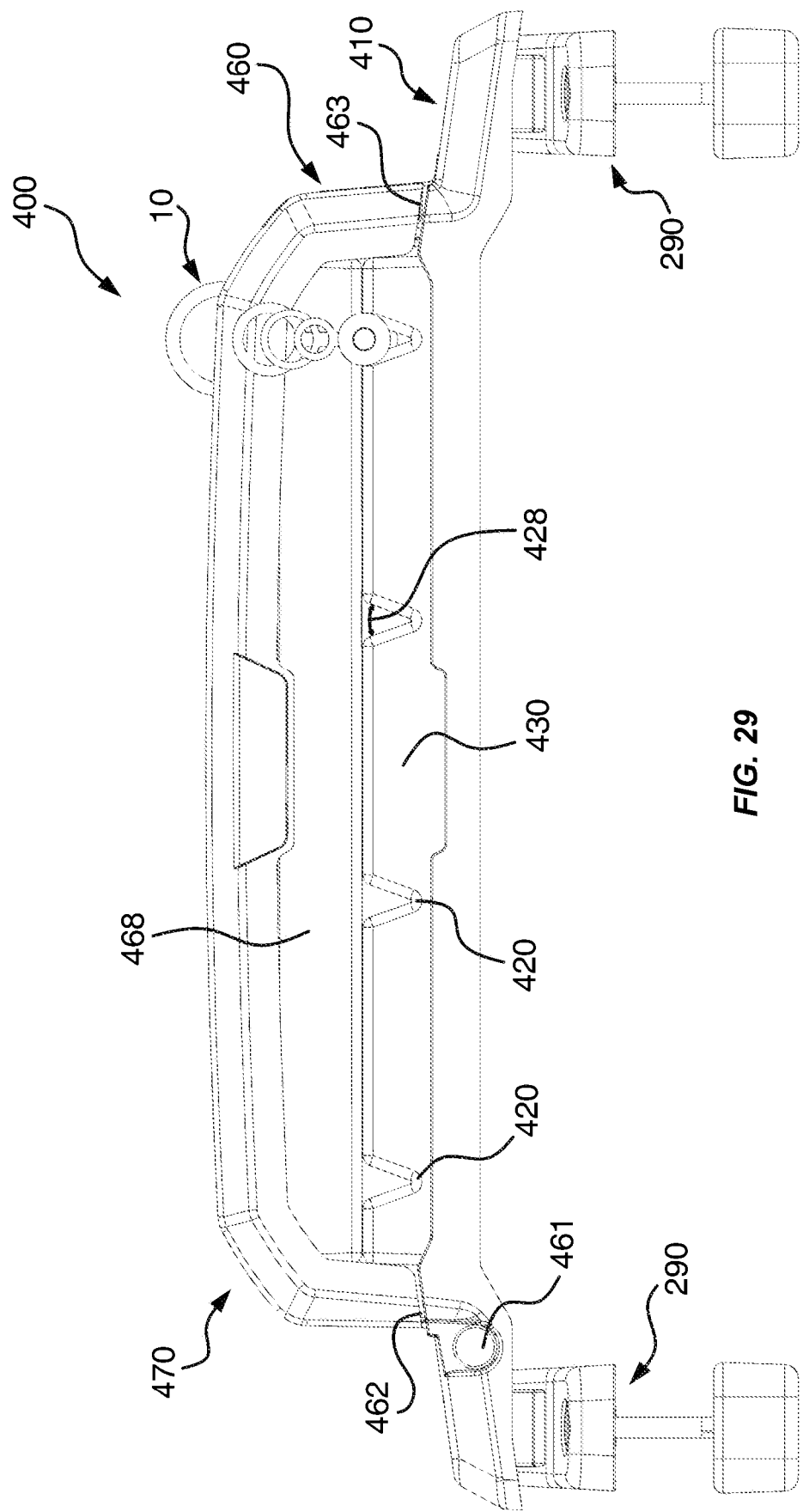
FIG. 29 is a front view of an equipment holder according to an embodiment.

In some embodiments, lid portion 460 can be coupled to base 410 (e.g., hingedly coupled) and rotatable between a closed position 470 (see FIG. 27) and an open position 480 (see FIG. 28). In some embodiments, lid portion 460 has a first end 462, a second end 463, and padding 468 disposed on the underside of lid portion 460 (see FIG. 29). In some embodiments, first end 462 of lid portion 460 is coupled to base 410 by a hinge member 461. As shown in FIG. 28, for example, second end 463 of lid portion 460 can include a slot 464 for receiving a releasable fastener 466 disposed on base 410. When lid portion 460 is rotated from open position 480 to closed position 470, slot 464 engages releasable fastener 466, and padding 468 engages padding 430 of base 410 thereby enclosing fishing rod 12 within fishing rod receptacles 420. In some embodiments, to open equipment holder 400, releasable fastener 466 is depressed and lid portion 460 is released from the closed position 470.

It is to be appreciated that the Detailed Description section, and not the Summary and Abstract sections, is intended to be used to interpret the claims. The Summary and Abstract sections can set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A fishing equipment securement device for securing fishing equipment to a vehicle, the fishing equipment securement device comprising:
a clamp comprising:
a base;
a first clamping portion comprising a rotation member, wherein the first clamping portion is pivotally coupled to the base via a pivot and pivotable between a closed position and an open position, and wherein the pivot is disposed in the base; and
a biasing member configured to bias the first clamping portion toward the closed position.

2. The fishing equipment securement device of claim 1, wherein the clamp further comprises a second clamping portion coupled to the base.

3. The fishing equipment securement device of claim 2, wherein a portion of an inner surface of the first clamping portion is concave, and wherein a portion of an inner surface of the second clamping portion is concave.

4. The fishing equipment securement device of claim 2, wherein a portion of the inner surface of the first clamping portion comprises padding, and wherein a portion of the inner surface of the second clamping portion comprises padding.

5. The fishing equipment securement device of claim 2, wherein the first clamping portion comprises a first notch configured to receive a reel stem within the first notch and the second clamping portion comprises a second notch configured to receive the reel stem within the second notch.

6. The fishing equipment securement device of claim 1, wherein the clamp further comprises a securement latch that releasably couples the first clamping portion to a second clamping portion.

7. The fishing equipment carrier of claim 6, wherein the securement latch is rotatably coupled to the second clamping portion and configured to engage a protrusion on the first clamping portion.

8. The fishing equipment carrier of claim 6, wherein the securement latch comprises a slot having a plurality of notches, wherein each notch is configured to engage a protrusion on the first clamping portion.

9. The fishing equipment securement device of claim 1, wherein when a fishing rod is disposed in the clamp, a reel coupled to the fishing rod is disposed above the fishing rod.

10. A fishing equipment carrier for a vehicle, the fishing equipment carrier comprising:
a carrier box comprising a bottom portion defining a first compartment space with a first volume and a lid portion defining a second compartment space with a second volume, wherein the lid portion is movably coupled to the bottom portion; and
a clamp comprising:
a base disposed in the first compartment space of the carrier box;
a first clamping portion coupled to the base and rotatable between a closed position and an open position;
a second clamping portion coupled to the base; and
a biasing member configured to bias the first clamping portion toward the closed position,
wherein when a fishing rod is disposed in the clamp, a reel coupled to the fishing rod is disposed above the fishing rod.

11. The fishing equipment carrier of claim 10, wherein the base of the clamp is coupled to an interior surface of the first compartment space of the carrier box.

12. The fishing equipment carrier of claim 10, wherein the carrier box further comprises a clamp positioning rail disposed in the first compartment space, and wherein the clamp is movably coupled to the clamp positioning rail.

13. The fishing equipment carrier of claim 10, further comprising a slot disposed through the bottom portion of the carrier box, wherein the clamp is coupled to the bottom portion by a fastener disposed through the slot, and wherein the clamp is configured to be disposed at multiple positions along a length of the slot.

14. The fishing equipment carrier of claim 10, wherein the second volume of the second compartment space of the carrier box is greater than the first volume of the first compartment space of the carrier box.

15. A fishing equipment carrier for a vehicle, the fishing equipment carrier comprising:
a carrier box comprising a bottom portion and a lid portion, wherein a maximum height of the lid portion is greater than a maximum height of the bottom portion, and wherein the lid portion is disposed above the bottom portion in a closed configuration, and wherein the bottom portion comprises a first volume and the lid portion comprises a second volume; and
a fishing rod holder comprising:
a base portion comprising a fishing rod receptacle configured to receive a fishing rod; and
an upper portion hingedly coupled to the base portion, wherein the upper portion is configured to pivot between an open position and a closed position, wherein in the closed position, the upper portion is disposed over the base portion to secure the fishing rod between the upper portion and the base portion.

16. The fishing equipment carrier of claim 15, wherein a reel of the fishing rod is disposed above the fishing rod when the fishing rod is disposed in a clamp in the carrier box.

17. The fishing equipment carrier of claim 15, wherein the base portion comprises a plurality of fishing rod receptacles, wherein each fishing rod receptacle is configured to receive a fishing rod.

18. The fishing equipment carrier of claim 15, further comprising a plurality of clamps disposed in the carrier box, wherein the clamps are each configured to hold the fishing rod.

19. A fishing equipment carrier box for a vehicle, the fishing equipment carrier box comprising:
a bottom portion defining a compartment space having a longitudinal direction defined by a front end and a rear end of the carrier box and a transverse direction defined by a first lateral side and a second lateral side of the carrier box; and
a plurality of clamps coupled to the bottom portion and each configured to secure a fishing rod,
wherein the plurality of clamps are adjustably coupled to the bottom portion of the carrier box and configured to be disposed at multiple positions along the longitudinal direction of the carrier box such that a first clamp is configured to be offset from a second clamp in both the longitudinal and traverse directions.

20. A fishing equipment securement device for securing fishing equipment to a vehicle, the fishing equipment securement device comprising:
a clamp comprising:
a base;
a first clamping portion comprising a rotation member, wherein the first clamping portion is rotatably coupled to the base and rotatable between a closed position and an open position; and
a biasing member configured to bias the first clamping portion toward the closed position,
wherein the clamp further comprises a securement latch that releasably couples the first clamping portion to a second clamping portion, and
wherein the securement latch is rotatably coupled to the second clamping portion and configured to engage a protrusion on the first clamping portion.

21. A fishing equipment securement device for securing fishing equipment to a vehicle, the fishing equipment securement device comprising:
a clamp comprising:
a base;
a first clamping portion comprising a rotation member, wherein the first clamping portion is rotatably coupled to the base and rotatable between a closed position and an open position; and
a biasing member configured to bias the first clamping portion toward the closed position,
wherein the clamp further comprises a securement latch that releasably couples the first clamping portion to a second clamping portion, and
wherein the securement latch comprises a slot having a plurality of notches, wherein each notch is configured to engage the a protrusion on the first clamping portion.

22. A fishing equipment securement device for securing fishing equipment to a vehicle, the fishing equipment securement device comprising:
- a clamp comprising:
  - a base;
  - a first clamping portion comprising a rotation member, wherein the first clamping portion is rotatably coupled to the base and rotatable between a closed position and an open position; and
  - a biasing member configured to bias the first clamping portion toward the closed position,
- wherein the clamp further comprises a second clamping portion coupled to the base, and
- wherein the first clamping portion comprises a first notch configured to receive a reel stem within the first notch and the second clamping portion comprises a second notch configured to receive the reel stem within the second notch.

23. A fishing equipment carrier for a vehicle, the fishing equipment carrier comprising:
- a carrier box comprising a bottom portion defining a first compartment space and a lid portion defining a second compartment space, wherein the lid portion is movably coupled to the bottom portion;
- a clamp comprising:
  - a base disposed in the first compartment space of the carrier box;
  - a first clamping portion coupled to the base and rotatable between a close position and an open position;
  - a second clamping portion coupled to the base; and
  - a biasing member configured to bias the first clamping portion toward the closed position, and
- wherein a slot is disposed through the bottom portion of the carrier box, wherein the clamp is coupled to the bottom portion by a fastener disposed through the slot, and wherein the clamp is configured to be disposed at multiple positions along a length of the slot,
- wherein when a fishing rod is disposed in the clamp, a reel coupled to the fishing rod is disposed above the fishing rod.

* * * * *

UNITED STATES PATENT AND TRADEMARK OFFICE
CERTIFICATE OF CORRECTION

| | |
|---|---|
| PATENT NO. | : 11,745,667 B2 |
| APPLICATION NO. | : 17/223927 |
| DATED | : September 5, 2023 |
| INVENTOR(S) | : Viklund et al. |

It is certified that error appears in the above-identified patent and that said Letters Patent is hereby corrected as shown below:

In the Claims

In Column 23, Claim 7, Line 10, delete "carrier" and insert --securement device--, therefor.

In Column 23, Claim 8, Line 14, delete "carrier" and insert --securement device--, therefor.

In Column 24, Claim 21, Line 67, after "engage" delete "the".

Signed and Sealed this
Fourteenth Day of November, 2023

Katherine Kelly Vidal
*Director of the United States Patent and Trademark Office*